US010759485B2

(12) United States Patent
Sasaki

(10) Patent No.: US 10,759,485 B2
(45) Date of Patent: Sep. 1, 2020

(54) LEANING VEHICLE

(71) Applicant: YAMAHA HATSUDOKI KABUSHIKI KAISHA, Iwata-shi, Shizuoka (JP)

(72) Inventor: Takahiro Sasaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 98 days.

(21) Appl. No.: 16/169,305

(22) Filed: Oct. 24, 2018

(65) Prior Publication Data

US 2019/0118598 A1     Apr. 25, 2019

(30) Foreign Application Priority Data

Oct. 25, 2017  (JP) ................. 2017-206641

(51) Int. Cl.
    *B62K 5/027*     (2013.01)
    *B60G 7/02*      (2006.01)
    (Continued)

(52) U.S. Cl.
    CPC ............. *B62K 5/027* (2013.01); *B60G 5/02* (2013.01); *B60G 7/001* (2013.01); *B60G 7/02* (2013.01);
    (Continued)

(58) Field of Classification Search
    CPC . B60G 7/02; B60G 5/02; B60G 7/001; B60G 2300/122; B62K 5/027; B62K 5/05;
    (Continued)

(56) References Cited

U.S. PATENT DOCUMENTS 3,341,222 A * 9/1967 Roberts .................. B62D 25/16
                                                    280/851
5,207,455 A * 5/1993 Gotz ...................... B62D 25/16
                                                    280/847
(Continued)

FOREIGN PATENT DOCUMENTS

CN          201325522 Y     10/2009
EP          2 921 388 A1     9/2015
(Continued)

OTHER PUBLICATIONS

Official Communication issued in corresponding European Patent Application No. 18202529.6, dated Mar. 21, 2019.

*Primary Examiner* — Frank B Vanaman
(74) *Attorney, Agent, or Firm* — Keating and Bennett, LLP

(57) ABSTRACT

A right shock absorber and a left shock absorber are provided on outer sides of a left front wheel and a right front wheel that define a steering allowable space therebetween. At a lower portion of the right shock absorber, an outer edge of a right front fender is positioned farther radially outwards than an outer edge of the right front wheel, and a right guide wall that extends from the outer edge inwards is provided in an upper rear area to the left of the right front wheel. At a lower portion of the left shock absorber, an outer edge of a left front fender is positioned farther radially outwards than an outer edge of the left front wheel, and a left guide wall that extends from the outer edge inwards is provided in an upper rear area to the right of the left front wheel.

5 Claims, 9 Drawing Sheets

(51) Int. Cl.
*B60G 5/02* (2006.01)
*B62D 25/16* (2006.01)
*B60G 7/00* (2006.01)
*B62J 15/00* (2006.01)
*B62K 5/05* (2013.01)
*B62K 5/10* (2013.01)
*B62K 5/08* (2006.01)
*B62D 61/06* (2006.01)

(52) U.S. Cl.
CPC ............ *B62D 25/16* (2013.01); *B62J 15/00* (2013.01); *B62K 5/05* (2013.01); *B62K 5/08* (2013.01); *B62K 5/10* (2013.01); *B60G 2300/122* (2013.01); *B62D 61/065* (2013.01)

(58) Field of Classification Search
CPC ... B62K 5/08; B62K 5/10; B62J 15/00; B62D 63/02; B62D 25/16; B62D 61/065
See application file for complete search history.

(56) References Cited

U.S. PATENT DOCUMENTS

| | | | | |
|---|---|---|---|---|
| 5,326,135 | A | * | 7/1994 | Nakayama ............ B62D 25/16 280/850 |
| D656,435 | S | | 3/2012 | Lambri et al. |
| 2003/0160472 | A1 | * | 8/2003 | Xia ........................ B60K 13/02 296/65.09 |
| 2005/0012291 | A1 | * | 1/2005 | Bagnoli .................. B62K 5/05 280/124.103 |
| 2005/0167174 | A1 | * | 8/2005 | Marcacci ........... B60G 17/0152 180/76 |
| 2006/0170171 | A1 | * | 8/2006 | Pedersen .............. B60G 21/007 280/62 |
| 2008/0115994 | A1 | * | 5/2008 | Martini .................... B62D 9/02 180/210 |
| 2010/0147615 | A1 | * | 6/2010 | Tsujii ..................... B60G 3/145 180/215 |
| 2015/0027830 | A1 | * | 1/2015 | Yoshimoto ............. B62K 25/08 188/314 |
| 2015/0298736 | A1 | | 10/2015 | Sasaki et al. |
| 2015/0314827 | A1 | | 11/2015 | Takano |
| 2015/0321721 | A1 | | 11/2015 | Sasaki et al. |
| 2015/0344091 | A1 | | 12/2015 | Takano |
| 2016/0129964 | A1 | | 5/2016 | Takano |
| 2016/0137247 | A1 | | 5/2016 | Sasaki et al. |
| 2016/0185413 | A1 | | 6/2016 | Takano |

FOREIGN PATENT DOCUMENTS

| | | |
|---|---|---|
| EP | 3 162 680 A2 | 5/2017 |
| WO | 2015/002169 A1 | 1/2015 |

* cited by examiner

LEANING VEHICLE

CROSS REFERENCE TO RELATED APPLICATIONS

This application claims the benefit of priority to Japanese Patent Application No. 2017-206641 filed on Oct. 25, 2017. The entire contents of this application are hereby incorporated herein by reference.

BACKGROUND OF THE INVENTION

1. Field of the Invention

The present invention relates to a leaning vehicle including two front wheels that are aligned side by side in a left-and-right direction.

2. Description of the Related Art

International Patent Publication WO 2015/002169 describes a leaning vehicle that includes a right front wheel and a left front wheel that are aligned side by side in a left-and-right direction and shock absorbing devices provided between the right front wheel and the left front wheel. This leaning vehicle includes a parallelogram-type link mechanism and leans to the right of the vehicle when turning right, while leaning to the left of the vehicle when turning left.

Incidentally, in a leaning vehicle like the one described above that has a right front wheel and a left front wheel as well as a parallelogram link mechanism, to suppress an interference between the right front wheel and the left front wheel, a space is provided directly below a cross member of the link mechanism and between the right front wheel and the left front wheel (hereinafter, referred to as a steering allowable space).

SUMMARY OF THE INVENTION

When the leaning vehicle described above runs on a wet road surface, water on the road surface is splashed up by the right front wheel and the left front wheel. Part of the water splashed up by the right front wheel and the left front wheel enters the steering allowable space. The inventor of preferred embodiments of the present invention has studied thoroughly this phenomenon.

As described in WO 2015/002169, in the case where the shock absorbing devices are provided between the right front wheel and the left front wheel, water splashed up towards the left by the right front wheel adheres to a right shock absorbing device, or a stay that extends therefrom, and falls downwards. In addition, water splashed up to the right by the left front wheel adheres to a left shock absorbing device, or a stay that extends therefrom, and falls downwards. Due to this, it does not become a problem that a rider is splashed with water splashed by the right front wheel and the left front wheel.

The inventor of preferred embodiments of the present invention has studied a leaning vehicle that differs from the leaning vehicle described in WO 2015/002169 in which a right shock absorbing device is provided to the right of a right front wheel and a left shock absorbing device is provided to the left of a left shock absorber. Then, the inventor discovered that this leaning vehicle tends to easily cause a problem in that a rider of the leaning vehicle is splashed with water splashed up by the right front wheel and the left front wheel.

Initially, the inventor assumed that water that entered the steering allowable space would fall by virtue of its own weight from below the steering allowable space to the ground. However, it was discovered that as a result of water continuing to splash up towards the steering allowable space from the right front wheel and the left front wheel at all times, although the water falls down, at least a portion of water that stays within the steering allowable space passes in front of the vehicle to be scattered to the upper portion of the front portion of the vehicle including the headlamp, the front fairing and the like. Additionally, as a result of water scattered to the left from the right front wheel striking water scattered to the right from the left front wheel within the steering allowable space, the scattered water forms minute particles within the steering allowable space. It has also been discovered that the water that takes the form of minute particles passes in front of the leaning vehicle to be scattered to the upper portion of the front portion of the vehicle.

It was considered to provide a cover over and at the front of the steering allowable space to suppress the scattering of water to the upper portion of the front portion of the vehicle. However, in the case where this approach is used, the design of the vehicle is limited, and the size of the vehicle may be enlarged.

Preferred embodiments of the present invention provide leaning vehicles in which water splashed up by a left front wheel and a right front wheel is prevented from passing in front of the vehicles so that the water is prevented from being scattered to an upper portion front portions of the vehicles while preventing an enlargement in the sizes of the vehicles.

According to a preferred embodiment of the present invention, a leaning vehicle includes a body frame that leans right when the vehicle turns to the right and leans left when the vehicle turns to the left; a right front wheel that is displaced relative to the body frame as the body frame leans and turns about a right axle member that extends in a right axle axis direction; a left front wheel that is displaced relative to the body frame as the body frame leans and turns about a left axle member that extends in a left axle axis direction; a linkage that changes relative positions of the right front wheel and the left front wheel in an up-and-down direction of the body frame as the body frame leans; a right shock absorber supporting a right portion of the right axle member at a lower portion thereof and that absorbs a displacement of the lower portion relative to an upper portion thereof in the direction of a right extension and contraction axis that extends in the up-and-down direction of the body frame; and a left shock absorber supporting a left portion of the left axle member at a lower portion thereof and that absorbs a displacement of the lower portion relative to an upper portion thereof in the direction of a left extension and contraction axis that extends in the up-and-down direction of the body frame; wherein the linkage includes a right side member that supports an upper portion of the right shock absorber so as to turn about a right steering axis that extends in the up-and-down direction of the body frame; a left side member that supports an upper portion of the left shock absorber so as to turn about a left steering axis that is parallel to the right steering axis; an upper cross member that supports an upper portion of the right side member at a right end portion thereof so as to turn about a right upper axis that extends in a front-and-rear direction of the body frame, supports an upper portion of the left side member at a left end portion thereof so as to turn about a left upper axis that is parallel to the right upper axis, and is supported on the body frame at a middle portion thereof so as to turn about a middle upper axis that is parallel to the right upper axis and the left upper axis; and a lower cross member that supports a lower portion of the right side member at a right end portion thereof so as to turn about a right lower axis that is parallel to the right upper axis, supports a lower portion of the left side member at a left end portion thereof so as to turn about a left lower axis that is parallel to the left upper axis, and is supported on the body frame at a middle portion thereof so as to turn about a middle lower axis that is parallel to the middle upper axis; with the vehicle maintained in an upright state, a lower end of the lower cross member is positioned above an upper end of the right front wheel and an upper end of the left front wheel in relation to the up-and-down direction of the body frame, the right front wheel and the left front wheel are spaced apart from each other in a left-and-right direction of the vehicle with a steering allowable space defined therebetween such that the right front wheel is able to turn about the right steering axis and the left front wheel is able to turn about the left steering axis; the right shock absorber is provided at a side of the right front wheel opposite to a side facing the steering allowable space in relation to a left-and-right direction of the body frame; the left shock absorber is provided at a side of the left front wheel opposite to a side facing the steering allowable space in relation to the left-and-right direction of the body frame; a right fender is provided at a lower portion of the right shock absorber so as to be displaced together with the right front wheel as the right shock absorber is displaced; an outer edge of the right fender is positioned radially outwards of an outer edge of the right front wheel when the right fender and the right front wheel are seen from the left in the right axle axis direction; when the right front wheel is virtually divided into four uniform areas by a straight line that extends in a vertical direction and intersects the right axle axis and a straight line that extends in a horizontal direction and intersects the right axle axis, the right fender includes, as seen from the left in the right axle axis direction, in an upper rear area of the right front wheel a right guide wall that extends inwards and towards the right axle axis from the outer edge on a left side of the right front wheel; a left fender is provided at a lower portion of the left shock absorber so as to be displaced together with the left front wheel as the left shock absorber is displaced; wherein an outer edge of the left fender is positioned radially outwards of an outer edge of the left front wheel when the left fender and the left front wheel are seen from the right in the left axle axis direction; and when the left front wheel is virtually divided into four uniform areas by a straight line that extends in a vertical direction and intersects the left axle axis and a straight line that extends in a horizontal direction and intersects the left axle axis, the left fender includes, as seen from the right in the left axle axis direction, in an upper rear area of the left front wheel a left guide wall that extends inwards and towards the left axle axis from the outer edge on a right side of the left front wheel.

The inventor of preferred embodiments of the present invention has discovered that an amount of water that enters the steering allowable space is significantly reduced or prevented so as to significantly reduce or prevent water that scatters to the front of the vehicle from the steering allowable space.

Providing a cover that covers the right front wheel when seen in the right axle axis direction at the left side of the right front wheel and a cover that covers the left front wheel when seen in the left axle axis direction at the right of the left front wheel is able to cut off water that attempts to enter the steering allowable space from the right front wheel and the left front wheel. However, this approach restricts greatly the design of the leaning vehicle. Additionally, the covers move greatly as the right front wheel and the left front wheel are turned, leading to an enlargement in the size of the vehicle in the left-and-right direction.

Then, the inventor of preferred embodiments of the present invention observed thoroughly how water splashed by the front wheels scatters or flies. Water on the road surface adheres to a ground contact surface of a tire first. An inertial force is provided to the water that adheres to the ground contact surface of the tire as the tire rotates. It was discovered that due to the effect of the inertial force, the water that adheres to the ground contact surface of the tire leaves from the ground contact surface at a point in time when the tire rotates a quarter of one rotation at an earliest timing, and that almost no water leaves from the ground contact surface at a point in time when the tire rotates a half of one rotation.

Water that leaves from a ground contact point flies substantially towards a tangential direction of the ground contact surface when seen from the axle axis direction. More specifically, water leaving the ground contact surface at a point in time when the tire rotates a quarter of one rotation flies upwards, and water leaving the ground contact surface at a point in time later than the point in time when the tire rotates a quarter of one rotation flies farther forward than the water that flew at the point in time when the tire rotates a quarter of one rotation. When looking at the front wheels from their traveling direction, water that leaves from the ground contact surface also flies to the right or left of the vehicle although a main stream thereof flies in a direction that is contained in an imaginary rotational plane of the front wheels.

Then, water that scatters to the left from the right front wheel and water that scatters to the right from the left front wheel collide with each other to scatter further in the steering allowable space, such that the scattering water is formed into minute particles, and it takes some time before the minute particles of water fall to the ground. In addition, it is a normal practice to provide a fender to suppress a scattering of the main stream of water that flies in the direction contained in the imaginary rotational plane of the front wheels. Water received by the fender flows on an inner surface of the fender to fall downwards from an edge portion of the fender. When the water falling downwards hits the rotating front wheels, the water is formed into minute particles of water that stay afloat in the steering allowable space.

Then, the inventor of preferred embodiments of the present invention discovered the idea to provide a right guide wall and a left guide wall in upper rear areas on sides of the front wheels when the front wheels are virtually divided into four uniform areas in the up-and-down direction and the front-and-rear direction when seen in the axle axis direction.

According to a preferred embodiment of the present invention, water splashed up by the right front wheel hits the right guide wall to adhere to the right guide wall. The water that adheres to the right guide wall then flows directly downwards over the right guide wall without entering the steering allowable space. Similarly, water splashed up by the left front wheel hits the left guide wall to flow directly downwards over the left guide wall without entering the steering allowable space.

An amount of water that enters the steering allowable space is reduced in the way described above, and therefore, it is difficult for water to be formed into minute particles of water in the steering allowable space. Thus, water is prevented from passing in front of the vehicle from the steering allowable space to adhere to the upper portion of the front portion of the vehicle. This structure obviates the necessity of providing a large cover at the front portion and the upper portion of the vehicle, such that an enlargement in the size of the vehicle is prevented.

In addition, providing the right guide wall only at a portion of the right fender is able to prevent water from entering the steering allowable space and also prevent an enlargement in the size of the right fender. Similarly, an enlargement in the size of the left fender is also be prevented. This also prevents an enlargement in the size of the vehicle.

In a preferred embodiment of the present invention, at least a portion of a lower edge of the right guide wall is preferably located leftward of a leftmost edge of a portion of the right front wheel, and at least a portion of a lower edge of the left guide wall is preferably located rightward of a rightmost edge of a portion of the left front wheel.

According to a preferred embodiment of the present invention, even though water that adheres to the guide walls falls downwards from the lower edges of the left and right guide walls, the water never splashes the front wheels such that the water is allowed to fall directly on the ground.

In a preferred embodiment of the present invention, the right fender preferably includes, in an upper front area of the right front wheel, a right inclined wall that connects to the right guide wall and extends inwards in the right axle axis direction farther than the right guide wall, and the left fender preferably includes, in an upper front area of the left front wheel, a left inclined wall that connects to the left guide wall and extends inwards in the left axle axis direction farther than the left guide wall.

According to a preferred embodiment of the present invention, the left and right inclined walls contribute to improving the rigidity of the left and right guide walls so as to prevent deformation of the left and right guide walls, thus making it possible to allow water to fall down onto the ground.

In a preferred embodiment of the present invention, a right guide groove is preferably provided on a left surface of the right guide wall so as to guide water adhering thereto to flow downwards, and a left guide groove is preferably provided on a right surface of the left guide wall so as to guide water adhering thereto to flow downwards.

According to a preferred embodiment of the present invention, water is guided downwards along the right guide groove and the left guide groove so as to fall down onto the ground.

In a preferred embodiment of the present invention, the right guide wall preferably extends from the outer edge of the right front wheel farther inwards than a shoulder portion of the right front wheel when seen from the left in the right axle axis direction, and the left guide wall preferably extends from the outer edge of the left front wheel farther inwards than a shoulder portion of the left front wheel when seen from the right in the left axle axis direction.

According to a preferred embodiment of the present invention, water adhering to the right guide wall and the left guide wall is guided downwards so as to fall down onto the ground.

According to a preferred embodiment of present invention, it is possible to provide a leaning vehicle in which water splashed up by the left front wheel and the right front wheel is prevented from passing in front of the vehicle so that the water is prevented from being scattered to the upper portion of the front portion of the vehicle while preventing an enlargement in the size of the vehicle.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
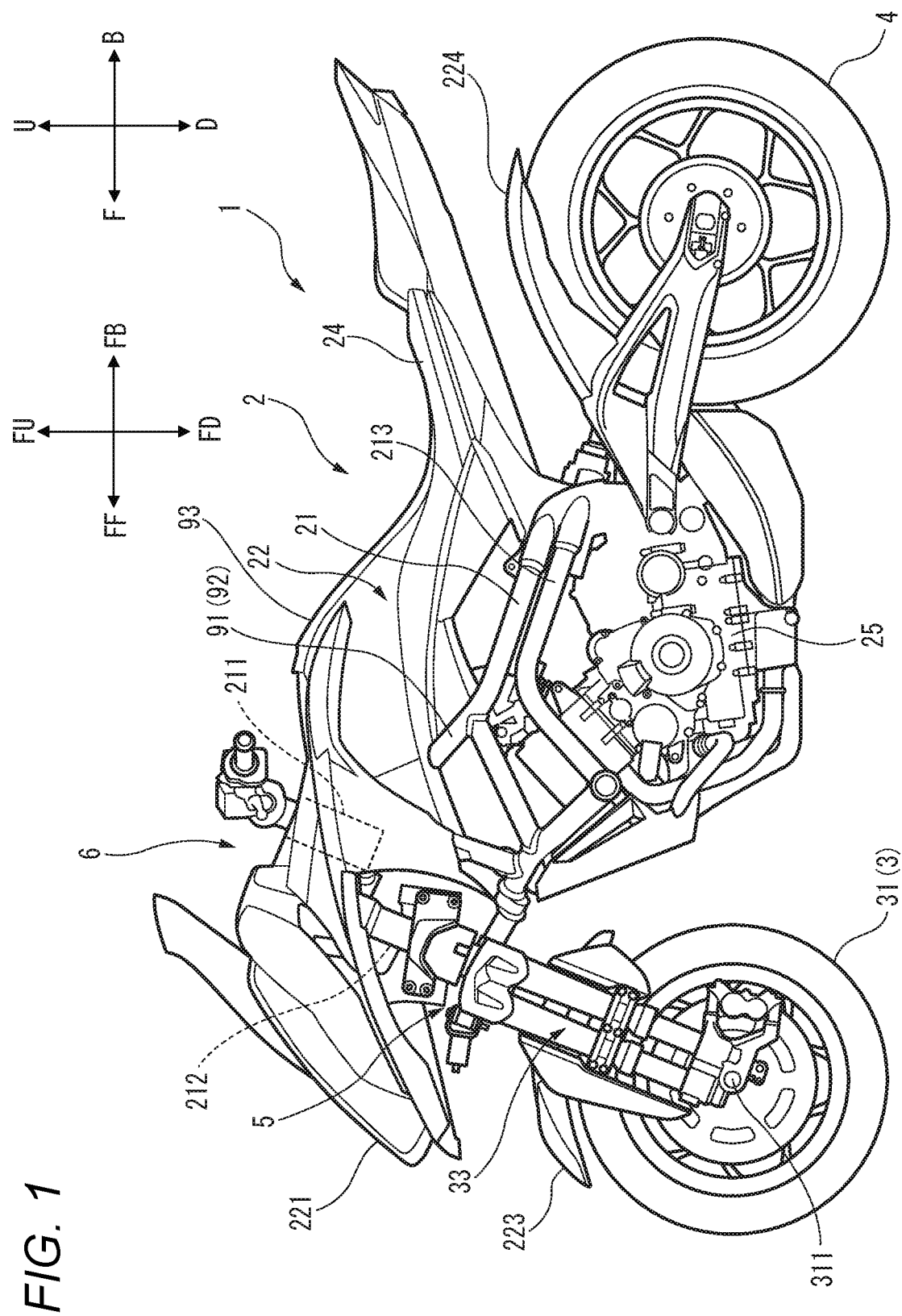
FIG. 1 is a side view showing an entire leaning vehicle according to a preferred embodiment of the present invention as seen from a left side thereof.

Referring to the accompanying drawings, preferred embodiments will be described in detail below.

In the accompanying drawings, an arrow F denotes ahead of a vehicle. An arrow B denotes behind the vehicle. An arrow U denotes above the vehicle. An arrow D denotes below the vehicle. An arrow R denotes on the right of the vehicle. An arrow L denotes on the left of the vehicle.

A vehicle turns with a body frame leaning in a left-and-right direction of the vehicle relative to a vertical direction. Then, in addition to the directions based on the vehicle, directions based on the vehicle body frame are defined. In the accompanying drawings, an arrow FF denotes ahead of the vehicle body frame. An arrow FB denotes behind the vehicle body frame. An arrow FU denotes above the vehicle body frame. An arrow FD denotes below the vehicle body frame. An arrow FR denotes on the right of the vehicle body frame. An arrow FL denotes on the left of the vehicle body frame.

In this description, a "front-and-rear direction of the body frame," a "left-and-right direction of the body frame," and an "up-and-down direction of the body frame" refer to a front-and-rear direction, a left-and-right direction, and an up-and-down direction based on the body frame as viewed from a rider who rides the vehicle. "The side of the body frame" denotes on the right or on the left of the body frame.

When referred to in this description, an expression reading "something extends in the front-and-rear direction of the vehicle body frame" includes a situation in which something extends in the front-and-rear direction of the vehicle body frame while being inclined in relation to the front-and-rear direction of the vehicle body frame and that something extends with a gradient which is closer to the front-and-rear direction of the vehicle body frame rather than the left-and-right direction and the up-and-down direction of the vehicle body frame.

In this description, an expression reading "something extends in the left-and-right direction of the vehicle body frame" includes a situation in which something extends in the left-and-right direction of the vehicle body frame while being inclined in relation to the left-and-right direction of the vehicle body frame and that something extends with a gradient which is closer to the left-and-right direction of the vehicle body frame rather than the front-and-rear direction and the up-and-down direction of the vehicle body frame.

In this description, an expression reading "something extends in the up-and-down direction of the vehicle body frame" includes a situation in which something extends in the up-and-down direction of the vehicle body frame while being inclined in relation to the up-and-down direction of the vehicle body frame and that something extends with a gradient which is closer to the up-and-down direction of the vehicle body frame rather than the front-and-rear direction and the left-and-right direction of the vehicle body frame.

In this description, an "upright state of the vehicle" or the "vehicle stands upright" refers to a state in which the vehicle remains not steered and the up-and-down direction of the body frame coincides with a vertical direction. In this state, the direction based on the vehicle coincides with the direction based on the body frame. When the vehicle is turning with the body frame caused to lean to the left or right from the vertical direction, the left-and-right direction of the vehicle does not coincide with the left-and-right direction of the body frame. The up-and-down direction of the vehicle does not coincide with the up-and-down direction of the body frame, too. However, the front-and-rear direction of the vehicle coincides with the front-and-rear direction of the body frame.

In this description, "rotation or rotating" refers to a member that is displaced at an angle of 360 degrees or more about a center axis thereof. In this description, "turn or turning" refers to a member that is displaced at an angle of less than 360 degrees about a center axis thereof.

Referring to FIGS. 1 to 7, a leaning vehicle 1 according to preferred embodiments of the present invention will be described. A leaning vehicle 1 is a vehicle that is driven by power generated from a power source and that includes a body frame that is able to lean and two front wheels that are aligned side by side in a left-and-right direction of the body frame.

FIG. 1 is a left side view of the entire leaning vehicle 1 as seen from the left thereof. The leaning vehicle 1 includes a vehicle main body 2, a pair of left and right front wheels 3, a rear wheel 4, a linkage 5, and a steering force transmission 6.

The vehicle main body 2 includes a body frame 21, a body cover 22, a seat 24, and an engine unit 25. In FIG. 1, the leaning vehicle 1 is standing in an upright state. The following description which will be provided with reference to FIG. 1 is based on the premise that the leaning vehicle 1 is standing or staying in the upright state.

The body frame 21 extends in a front-and-rear direction of the leaning vehicle 1. The body frame 21 includes a headpipe 211 and a link support 212.

The headpipe 211 supports an upstream side steering shaft 60, which will be described below, so as to turn. The headpipe 211 extends in an up-and-down direction of the body frame 21.

The link support 212 is provided ahead of the headstock 211 in the front-and-rear direction of the leaning vehicle 1. The link support 212 supports the linkage 5 so as to turn.

The body frame 21 supports the engine unit 25 behind the headstock 211 in the front-and-rear direction of the leaning vehicle 1. The engine unit 25 supports the rear wheel 4 so as to swing up and down. The engine unit 25 includes a power source such as an engine or an electric motor with a battery and a device such as a transmission. The power source generates a force by which the leaning vehicle 1 is driven.

The body cover 22 includes a front cover 221, a pair of left and right front fenders 223, and a rear fender 224. The body cover 22 is a body element that covers at least a portion of body elements that are mounted on the leaning vehicle 1 such as the pair of left and right front wheels 3, the body frame 21, the linkage 5 and the like.

The front cover 221 is disposed ahead of the seat 24. The front cover 221 covers the linkage 5 and at least a portion of the steering force transmission 6.

At least portions of the pair of left and right front fenders 223 are individually disposed directly below the front cover 221. At least the portions of the pair of left and right front fenders 223 are disposed directly above the pair of left and right front wheels 3, respectively.

At least a portion of the rear fender 224 is disposed directly above the rear wheel 4.

At least portions of the pair of left and right front wheels 3 are disposed directly below the front cover 221.

At least a portion of the rear wheel 4 is disposed below the seat 24. At least a portion of the rear wheel 4 is disposed directly below the rear fender 224.

Figure 2:
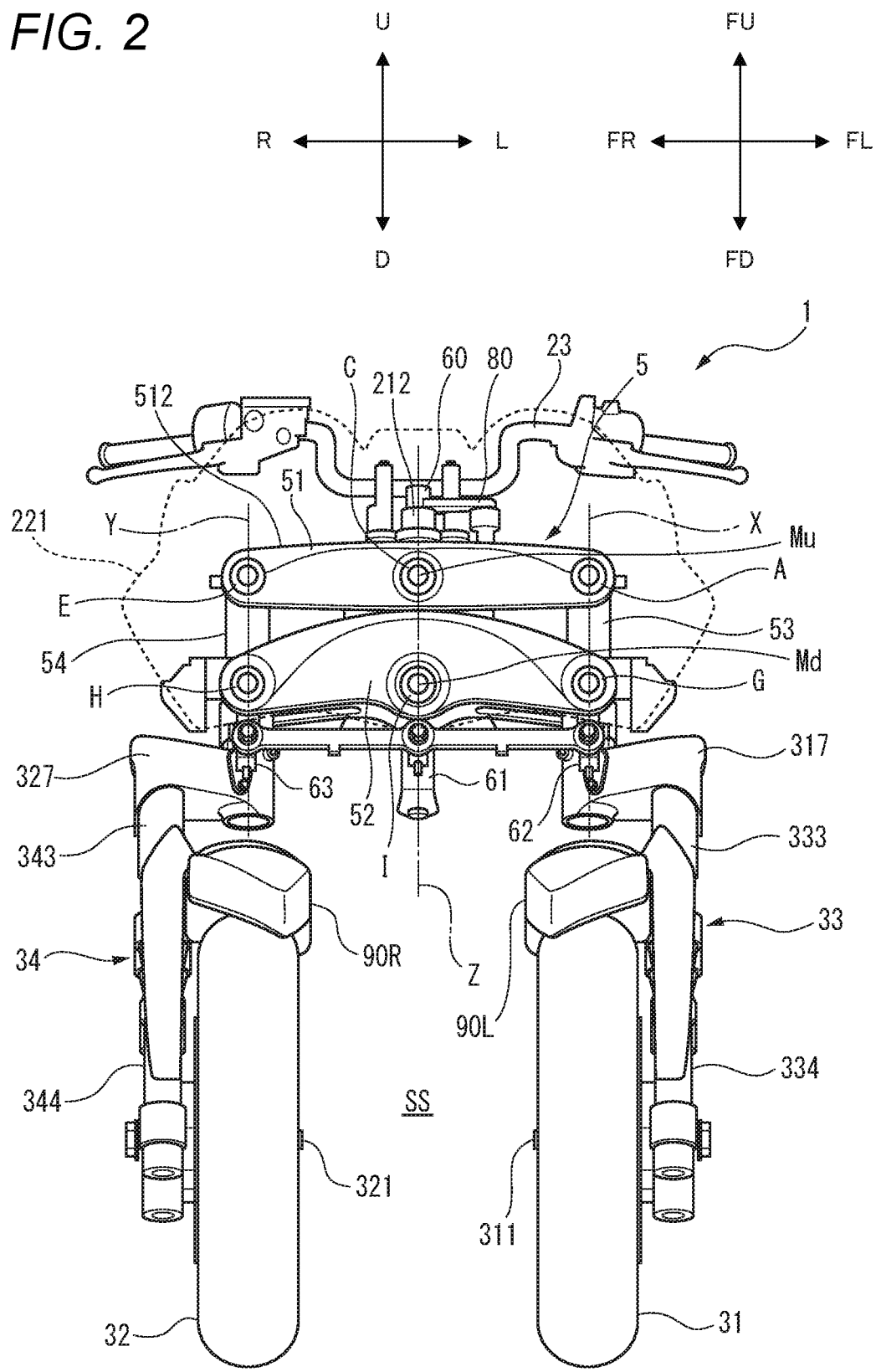
FIG. 2 is a front view showing a front portion of the leaning vehicle shown in FIG. 1.

FIG. 2 is a front view of the front portion of the leaning vehicle 1 as viewed from the front of the body frame 21. In FIG. 2, the leaning vehicle 1 is standing in the upright state. The following description which will be provided with reference to FIG. 2 is based on the premise that the leaning vehicle 1 is standing or staying in the upright state. FIG. 2 shows the front portion of the leaning vehicle 1 as seen through the front cover 221 that is indicated by dashed lines.

The pair of left and right front wheels 3 include a left front wheel 31 and a right front wheel 32. The left front wheel 31 and the right front wheel 32 are provided in the left-and-right direction of the vehicle body frame 21. The right front wheel 32 is provided on the right of the left front wheel 31 on the body frame 21.

The leaning vehicle 1 includes a left shock absorber 33, a right shock absorber 34, a left bracket 317, and a right bracket 327.

Figure 3:
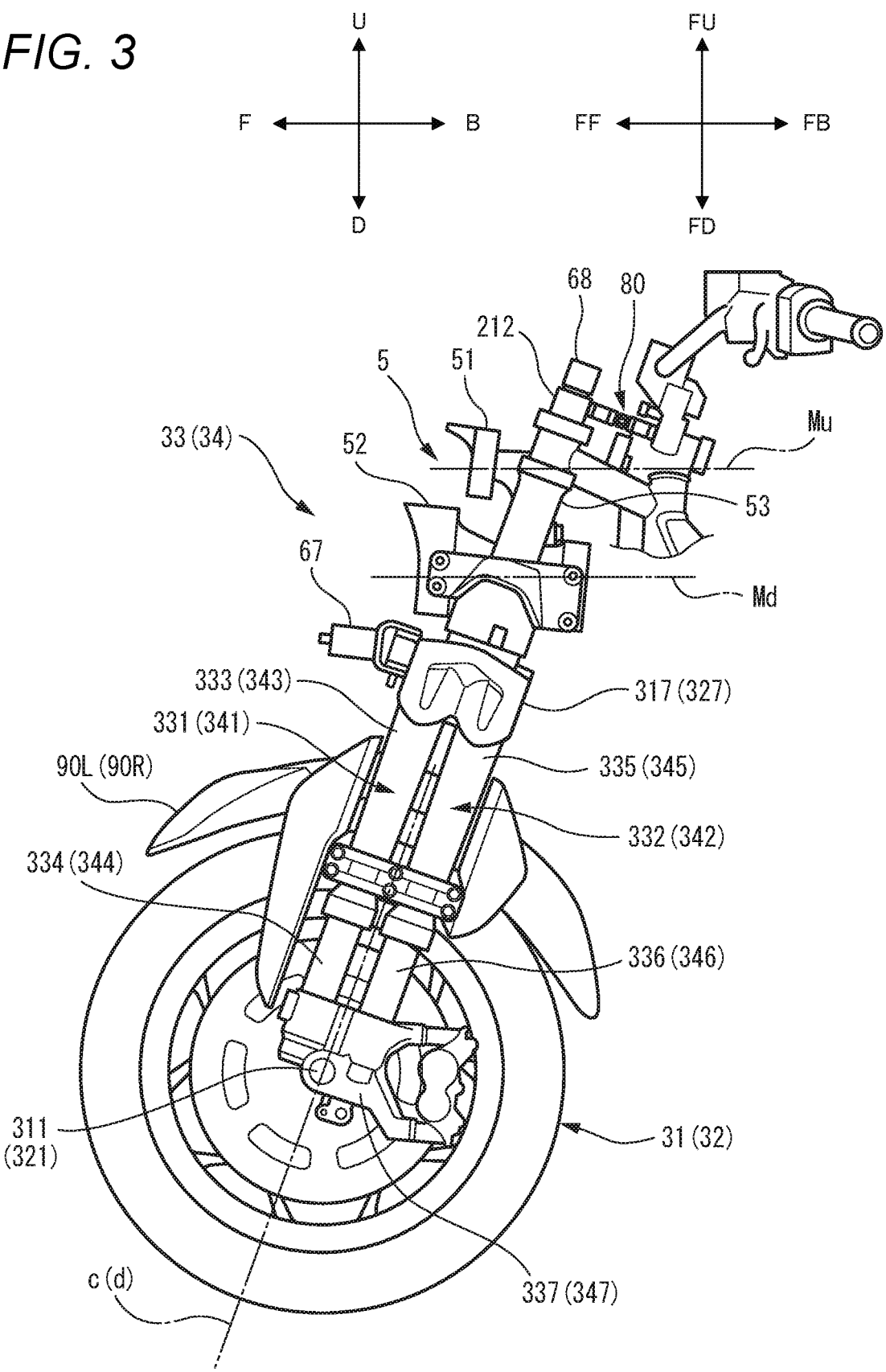
FIG. 3 is a side view showing a left shock absorber and a left front wheel.

FIG. 3 is a side view showing the left shock absorber 33 and the left front wheel 31. Since the right shock absorber 34 preferably has a structure symmetrical with the left shock absorber 33, the reference numbers showing the elements of the right shock absorber 34 are also added in FIG. 3.

As shown in FIG. 3, the left shock absorber 33 is preferably a so-called telescopic shock absorber. The left shock absorber 33 includes a left front telescopic element 331, a left rear telescopic element 332, and a left inner connector 337.

The left front telescopic element 331 includes a left front outer tube 333 and a left front inner tube 334. A lower portion of the left front inner tube 334 is connected to a left inner connector 337. An upper portion of the left front inner tube 334 is inserted into the left front outer tube 333. An upper portion of the left front outer tube 333 is connected to the left bracket 317. The left front inner tube 334 is displaced relative to the left front outer tube 333 along a left extension and contraction axis c which extends in the up-and-down direction of the body frame 21. The left front telescopic element 331 is able to extend and contract in the direction of the left extension and contraction axis c as a result of the left front inner tube 334 being displaced relative to the left front outer tube 333 along the left extension and contraction axis c.

At least a portion of the left rear telescopic element 332 is provided behind the left front telescopic element 331. The left rear telescopic element 332 includes a left rear outer tube 335 and a left rear inner tube 336. The left rear outer tube 335 and the left front outer tube 333 are connected together so as not to move relative to each other.

A lower portion of the left rear inner tube 336 is connected to a left inner connector 337. An upper portion of the left rear inner tube 336 is inserted into the left rear outer tube 335. An upper portion of the left rear outer tube 335 is connected to the left bracket 317.

The left rear inner tube 336 is displaced relative to the left rear outer tube 335 along the left extension and contraction axis c which extends in the up-and-down direction of the body frame 21. The left rear telescopic element 332 is able to extend and contract in the direction of the left extension and contraction axis c as a result of the left rear inner tube 336 being displaced relative to the left rear outer tube 335 along the left extension and contraction axis c.

The left inner connector 337 rotatably supports a left axle member 311 of the left front wheel 31. The left inner connector 337 connects a lower portion of the left front inner tube 334 and a lower portion of the left rear inner tube 336 together.

The left shock absorber 33 attenuates or absorbs a displacement of the left front wheel 31 relative to the left front outer tube 333 and the left rear outer tube 335 along the left extension and contraction axis c by an extending or contracting action of the left front telescopic element 331 and an extending or contracting action of the left rear telescopic element 332.

As shown in FIG. 3, the right shock absorber 34 is preferably a so-called telescopic shock absorber. The right shock absorber 34 includes a right front telescopic element 341, a right rear telescopic element 342, and a right inner connector 347.

The right front telescopic element 341 includes a right front outer tube 343 and a right front inner tube 344. A lower portion of the right front inner tube 344 is connected to a right inner connector 347. An upper portion of the right front inner tube 344 is inserted into a right front outer tube 343. An upper portion of the right front outer tube 343 is connected to the right bracket 327. With respect to the right front outer tube 343, the right inner tube 344 is displaced along a right extension and contraction axis d which extends in the up-and-down direction of the vehicle body frame 21. The right front telescopic element 341 is able to extend and contract in the direction of the right extension and contraction axis d as a result of the right front inner tube 344 being displaced relative to the right front outer tube 343 along the right extension and contraction axis d.

At least a portion of the right rear telescopic element 342 is provided behind the right front telescopic element 341. The right rear telescopic element 342 includes a right rear outer tube 345 and a right rear inner tube 346. The right rear outer tube 345 and the right front outer tube 343 are connected together so as not to move relative to each other.

A lower portion of the right rear inner tube 346 is connected to a rear inner connector 347. An upper portion of the right rear inner tube 346 is inserted to the right rear outer tube 345. An upper portion of the right rear outer tube 345 is connected to the right bracket 327.

With respect to the right rear outer tube 345, the right rear inner tube 346 is displaced along the right extension and contraction axis d which extends in the up-and-down direction of the vehicle body frame 21. The right rear telescopic element 342 is able to extend and contract in the direction of the right extension and contraction axis d as a result of the right rear inner tube 346 being displaced relative to the right rear outer tube 345 along the right extension and contraction axis d.

The right inner connector 347 rotatably supports a right axle member 321 of the right front wheel 32. The right inner connector 347 connects a lower portion of the right front inner tube 344 and a lower portion of the right rear inner tube 346 together.

The right shock absorber 34 attenuates or absorbs the displacement of the right front wheel 32 relative to the right front outer tube 343 and the right rear outer tube 345 along the right extension and contraction axis d by an extending or contracting action of the right front telescopic element 341 and an extending or contracting action of the right rear telescopic element 342.

Figure 4:
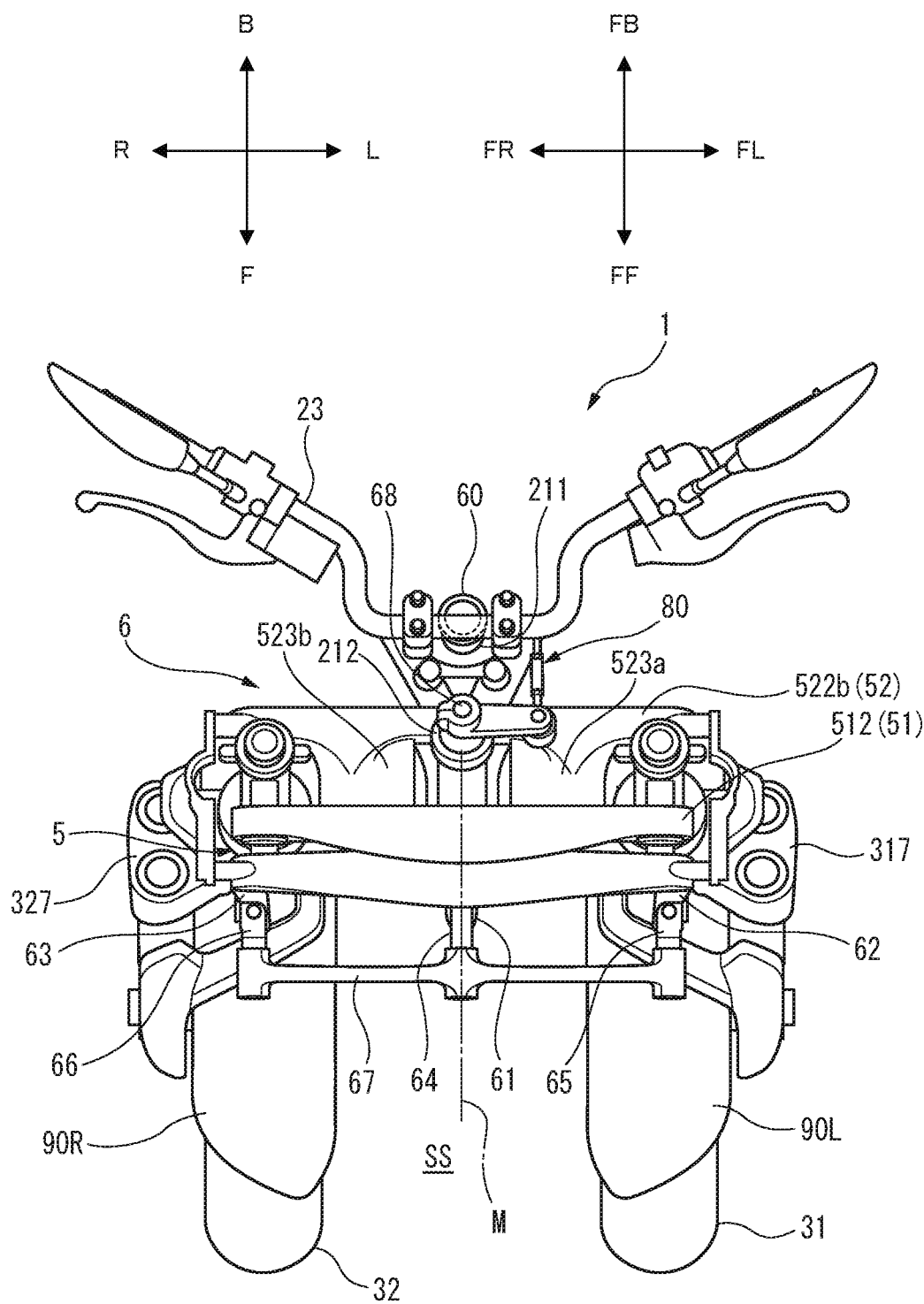
FIG. 4 is a plan view showing the front portion of the leaning vehicle shown in FIG. 1.

As shown in FIG. 4, the leaning vehicle 1 includes the steering force transmission 6. The steering force transmission 6 includes a handlebar 23 (an example of a steering force input), the upstream side steering shaft 60 (an example of a rear shaft member), a connecting member 80, and a downstream side steering shaft 68 (an example of a front shaft member).

The body frame 21 includes the headpipe 211 that supports the upstream side steering shaft 60 so as to turn and the link support 212 that supports the downstream side steering shaft 68 so as to turn. As shown in FIG. 2, the link support 212 extends in the direction of a middle steering axis Z which extends in the up-and-down direction of the body frame 21. In this preferred embodiment, a turning center (a central steering axis) of the handlebar 23 coincides with a turning center (a rear axis) of the upstream side steering shaft.

A steering force is inputted into the handlebar 23. The upstream side steering shaft 60 is connected to the handlebar 23. The upper portion of the upstream side steering shaft 60 is positioned behind the lower portion of the upstream side steering shaft 60 in the front-and-rear direction of the vehicle body frame 21. The upstream side steering shaft 60 is supported in the headpipe 211 so as to turn therein.

The connecting member 80 connects the upstream side steering shaft 60 and the downstream side steering shaft 68 together. The connecting member 80 is displaced as the upstream side steering shaft 60 turns. The connecting member 80 transmits the turning motion of the upstream side steering shaft 60 to the downstream side steering shaft 68.

The downstream side steering shaft 68 is supported in the link support 212 so as to turn therein. The downstream side steering shaft 68 is connected to the connecting member 80. The downstream side steering shaft 68 is provided ahead of the upstream side steering shaft 60 in the front-and-rear direction of the body frame 21. The downstream side steering shaft 68 turns in accordance with the displacement of the connecting member 80. As a result of the downstream side steering shaft 68 turning, the left front wheel 31 and the right front wheel 32 are steered or turned via a tie-rod 67.

The steering force transmission 6 transmits a steering force exerted on a handlebar 23 by the rider when operating the handlebar 23 to the left bracket 317 and the right bracket 327. A specific structure will be described in detail below.

In the leaning vehicle 1 according to this preferred embodiment, the linkage 5 preferably uses a four parallel joint link system (also referred to as a parallelogram link).

As shown in FIG. 2, the linkage 5 is disposed above the left front wheel 31 and the right front wheel 32. The linkage 5 includes an upper cross member 51, a lower cross member 52, a left side member 53, and a right side member 54. The linkage 5 is turnably supported on the link support 212 which extends to the middle steering axis Z. Even though the upstream side steering shaft 60 is turned as a result of the operation of the handlebar 23, the linkage 5 is prevented from following the turning motion of the upstream side steering shaft 60 and hence does not turn.

The upper cross member 51 includes a plate member 512. The plate member 512 is provided ahead of the link support 212. The plate member 512 extends in a left-and-right direction of the body frame 21.

A middle portion of the upper cross member 51 is connected to the link support 212 by a connecting portion C. The upper cross member 51 is able to turn relative to the link support 212 about a middle upper axis Mu that passes through the connecting portion C to extend in the front-and-rear direction of the body frame 21.

A left end portion of the upper cross member 51 is connected to the left side member 53 by a connecting portion A. The upper cross member 51 is able to turn relative to the left side member 53 about a left upper axis which passes through the connecting portion A to extend in the front-and-rear direction of the body frame 21.

A right end portion of the upper cross member 51 is connected to the right side member 54 by a connecting portion E. The upper cross member 51 is able to turn relative to the right side member 54 about a right upper axis that passes through the connecting portion E to extend in the front-and-rear direction of the body frame 21.

FIG. 4 is a plan view of the front portion of the leaning vehicle 1 as viewed from above the body frame 21. In FIG. 4, the leaning vehicle 1 is standing in the upright state. The following description which will be provided with reference to FIG. 4 is based on the premise that the leaning vehicle 1 is standing or staying in the upright state.

As shown in FIG. 4, the lower cross member 52 includes a lower front cross element 522a and a lower rear cross element 522b. The lower front cross element 522a is provided ahead of the link support 212. The lower rear cross element 522b is provided behind the link support 212. The lower front cross element 522a and the lower rear cross member 522b extend in the left-and-right direction of the body frame 21. The lower front cross element 522a and the lower rear cross member 522b are connected together by a left connecting block 523a and a right connecting block 532b. The left connecting block 523a is disposed on the left of the link support 212. The right connecting block 523b is disposed on the right of the link support 212.

Returning to FIG. 2, the lower cross member 52 is disposed below the upper cross member 51. The lower cross member 52 extends parallel to the upper cross member 51. A middle portion of the lower cross member 52 is connected to the link support 212 by a connecting portion I. The lower cross member 52 is able to turn about a middle down or lower axis Md that passes through the connecting portion I to extend in the front-and-rear direction of the body frame 21.

A left end portion of the lower cross member 52 is connected to the left side member 53 by a connecting portion G. The lower cross member 52 is able to turn about a left lower axis which passes through the connecting portion G to extend in the front-and-rear direction of the body frame 21.

A right end portion of the lower cross member 52 is connected to the right side member 54 by a connecting portion H. The lower cross member 52 is able to turn about a right lower axis which passes through the connecting portion H to extend in the front-and-rear direction of the body frame 21. A length of the upper cross member 51 from the connecting portion E to the connecting portion A is equal or substantially equal to a length of the lower cross member from the connecting portion H to the connecting portion G.

The middle upper axis Mu, the right upper axis, the left upper axis, the middle lower axis Md, the right lower axis, and the left lower axis extend parallel to one another. The middle upper axis Mu, the right upper axis, the left upper axis, the middle lower axis Md, the right lower axis, and the left lower axis are disposed above the left front wheel 31 and the right front wheel 32.

As shown in FIGS. 2 and 4, the left side member 53 is disposed on the left of the link support 212. The left side member 53 is disposed above the left front wheel 31. The left side member 53 extends parallel to the middle steering axis Z of the link support 212. An upper portion of the left side member 53 is disposed behind a lower portion thereof.

A lower portion of the left side member 53 is connected to the left bracket 317. The left bracket 317 is able to turn about a left steering axis X relative to the left side member 53. The left steering axis X extends parallel to the middle steering axis Z of the link support 212.

As shown in FIGS. 2 and 4, the right side member 54 is disposed on the right of the link support 212. The right side member 54 is disposed above the right front wheel 32. The right side member 54 extends parallel to the middle steering axis Z of the link support 212. An upper portion of the right side member 54 is disposed behind a lower portion thereof.

A lower portion of the right side member 54 is connected to the right bracket 327. The right bracket 327 is able to turn about a right steering axis Y relative to the right side member 54. The right steering axis Y extends parallel to the middle steering axis Z of the link support 212.

Thus, as has been described above, the upper cross member 51, the lower cross member 52, the left side member 53, and the right side member 54 are supported by the link support 212 so that the upper cross member 51 and the lower cross member 52 are held in postures which are parallel to each other and so that the left side member 53 and the right side member 54 are held in postures which are parallel to each other.

As shown in FIGS. 2 and 4, the steering force transmission 6 includes a middle transmission plate 61, a left transmission plate 62, a right transmission plate 63, a middle joint 64, a left joint 65, a right joint 66, and the tie-rod 67.

The middle transmission plate 61 is connected to a lower portion of the downstream side steering shaft 68. The middle transmission plate 61 cannot turn relative to the downstream side steering shaft 68. The middle transmission plate 61 is able to turn about the middle steering axis Z relative to the link support 212.

The left transmission plate 62 is disposed on the left of the middle transmission plate 61. The left transmission plate 62 is connected to the left bracket 317. The left transmission plate 62 cannot turn relative to the left bracket 317. The left transmission plate 62 is able to turn about the left steering axis X relative to the left side member 53.

The right transmission plate 63 is disposed on the right of the middle transmission plate 61. The right transmission plate 63 is connected to the right bracket 327. The right transmission plate 63 cannot turn relative to the right bracket 327. The right transmission plate 63 is able to turn about the right steering axis Y relative to the right side member 54.

As shown in FIG. 4, the middle joint 64 is connected to a front portion of the middle transmission plate 61 via a shaft portion that extends in the up-and-down direction of the body frame 21. The middle transmission plate 61 and the middle joint 64 are able to turn relative to each other about this shaft portion.

The left joint 65 is disposed directly on the left of the middle joint 64. The left joint 65 is connected to a front portion of the left transmission plate 62 via a shaft that extends in the up-and-down direction of the body frame 21. The left transmission plate 62 and the left joint 65 are able to turn relative to each other about this shaft portion.

The right joint 66 is disposed directly on the right of middle joint 64. The right joint 66 is connected to a front portion of the right transmission plate 63 via a shaft that extends in the up-and-down direction of the body frame 21. The right transmission plate 63 and the right joint 66 are able to turn relative to each other about this shaft portion.

A shaft portion that extends in the front-and-rear direction of the body frame 21 is provided at a front portion of the middle joint 64. A shaft portion that extends in the front-and-rear direction of the body frame 21 is provided at a front portion of the left joint 65. A shaft portion that extends in the front-and-rear direction of the body frame 21 is provided at a front portion of the right joint 66.

The tie-rod 67 extends in the left-and-right direction of the body frame 21. The tie-rod 67 is connected to the middle joint 64, the left joint 65, and the right joint 66 via those shaft portions. The tie rod 67 and the intermediate joint 64 are able to turn relatively about the shaft portion which is provided at the front portion of the intermediate joint 64. The tie-rod 67 and the left joint 65 are able to turn relative to each other about the shaft portion that is provided at the front portion of the left joint 65. The tie rod 67 and the right joint 66 are able to turn relative to each other about the shaft portion that is provided at the front portion of the right joint 66.

Figure 5:
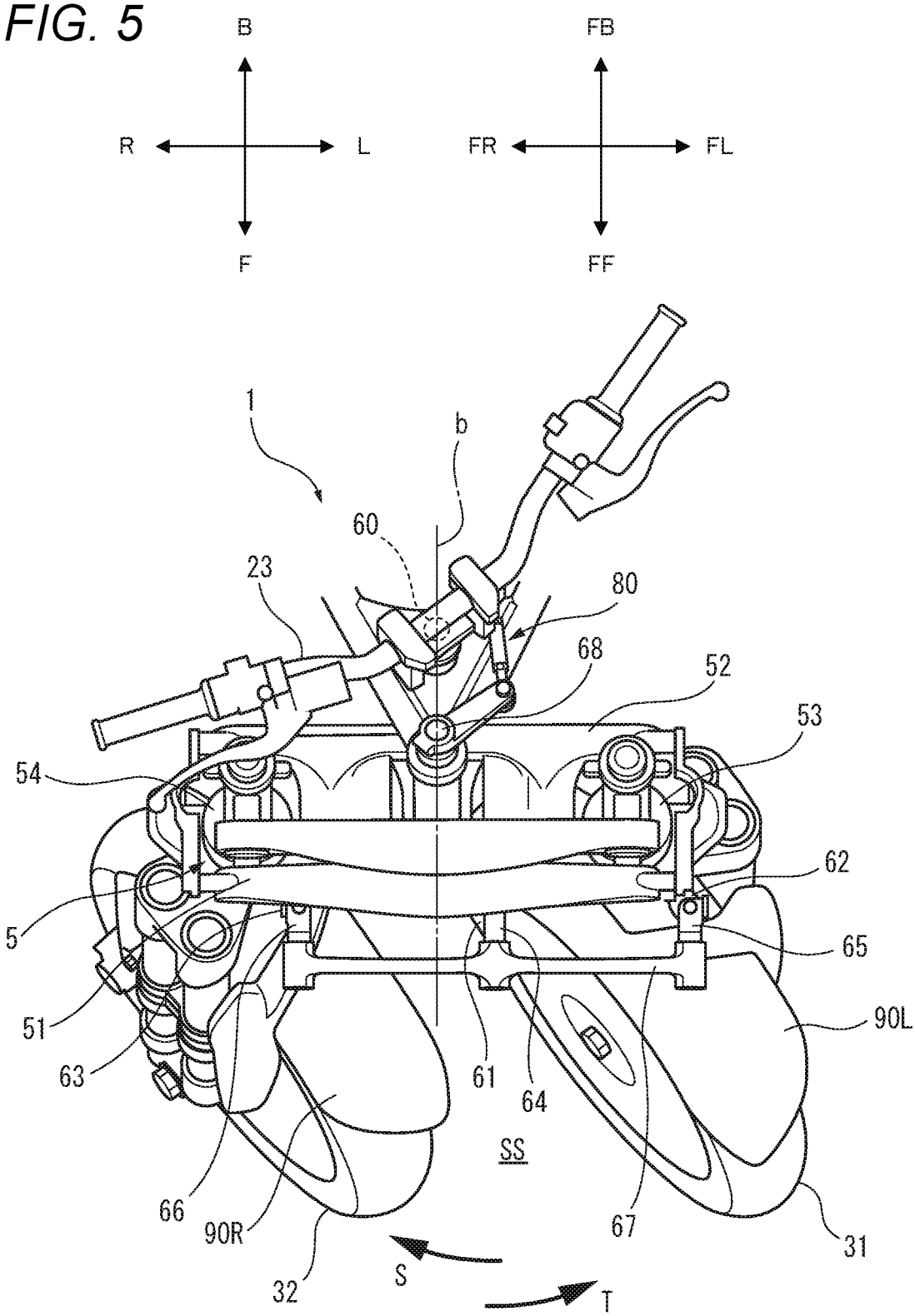
FIG. 5 is a plan view showing the front portion of the leaning vehicle shown in FIG. 1 when the vehicle is steered.

Next, referring to FIGS. 4 and 5, a steering operation of the leaning vehicle 1 will be described. FIG. 5 is a plan view, as seen from above the body frame 21, of the front portion of the leaning vehicle 1 with the left front wheel 31 and the right front wheel 32 steered or turned to the left.

When the rider operates the handlebar 23, the upstream side steering shaft 60 turns. The turning motion of the upstream side steering shaft 60 is transmitted to the downstream side steering shaft 68 via the connecting member 80. The downstream side steering shaft 68 turns relative to the link support 212 about a front steering axis b. In the case of the left front wheel 31 and the right front wheel 32 being turned to the left as shown in FIG. 5, as the handlebar 23 is operated, the middle transmission plate 61 turns relative to the link support 212 in a direction indicated by an arrow T about the front steering axis b.

In association with the turning of the middle transmission plate 61 in the direction indicated by the arrow T, the middle joint 64 of the tie-rod 67 turns relative to the middle transmission plate 61 in a direction indicated by an arrow S. This moves the tie-rod 67 leftward and rearward with its posture kept unchanged.

As the tie-rod 67 moves leftward and rearward, the left joint 65 and the right joint 66 of the tie-rod 67 turn in the direction indicated by the arrow S relative to the left transmission plate 62 and the right transmission plate 63, respectively. This causes the left transmission plate 62 and the right transmission plate 63 to turn in the direction indicated by the arrow T with the tie rod 67 maintaining its posture unchanged.

When the left transmission plate 62 turns in the direction indicated by the arrow T, the left bracket 317, which cannot turn relative to the left transmission plate 62, turns in the direction indicated by the arrow T about the left steering axis X relative to the left side member 53.

When the right transmission plate 63 turns in the direction indicated by the arrow T, the right bracket 327, which cannot turn relative to the right transmission plate 63, turns in the direction indicated by the arrow T about the right steering axis Y relative to the right side member 54.

When the left bracket 317 turns in the direction indicated by the arrow T, the left shock absorber 33, which is connected to the left bracket 317 via the left front outer tube 333 and the left rear outer tube 335, turns in the direction indicated by the arrow T about the left steering axis X relative to the left side member 53. When the left shock absorber 33 turns in the direction indicated by the arrow T, the left front wheel 31, which is supported on the left shock absorber 33, turns in the direction indicated by the arrow T about the left steering axis X relative to the left side member 53.

When the right bracket 327 turns in the direction indicated by the arrow T, the right shock absorber 34, which is connected to the right bracket 327 via the right front outer tube 343 and the right rear outer tube 345, turns in the direction indicated by the arrow T about the right steering axis Y relative to the right side member 54. When the right shock absorber 34 turns in the direction indicated by the arrow T, the right front wheel 32, which is supported on the right shock absorber 34, turns in the direction indicated by the arrow T about the right steering axis Y relative to the right side member 54.

When the rider operates the handlebar 23 so as to turn the left front wheel 31 and the right front wheel 32 to the right, the elements described above turn in the direction indicated by the arrow S. Since the elements move the other way around in relation to the left-and-right direction, detailed description thereof will be omitted here.

Thus, as has been described above, as the rider operates the handlebar 23, the steering force transmission 6 transmits the steering force accordingly to the left front wheel 31 and the right front wheel 32. The left front wheel 31 and the right front wheel 32 turn about the left steering axis X and the right steering axis Y, respectively, in the direction corresponding to the direction in which the handlebar 23 is operated by the rider.

Figure 6:
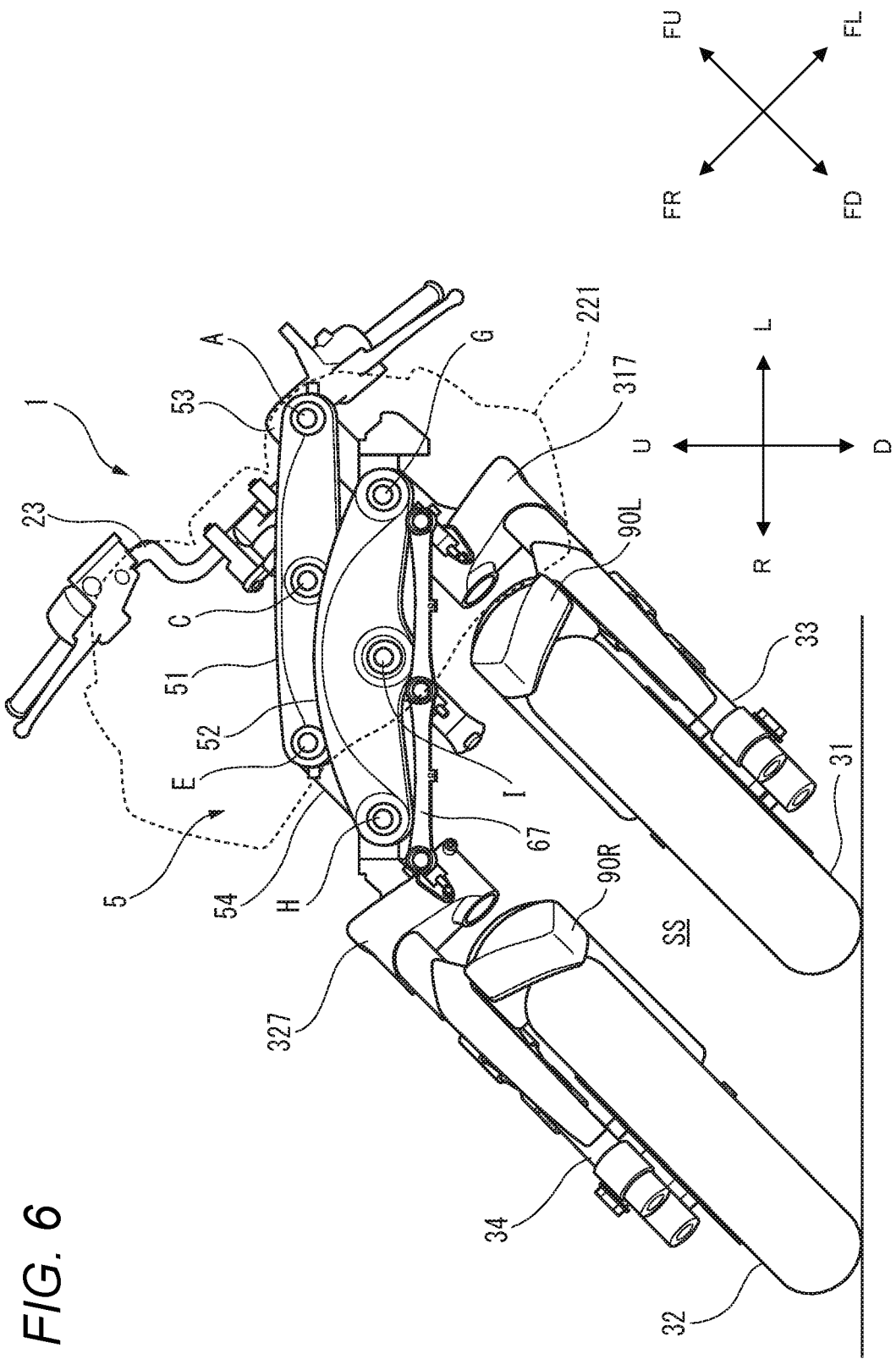
FIG. 6 is a front view showing the front portion of the leaning vehicle shown in FIG. 1 when the vehicle is caused to lean.

Next, referring to FIGS. 2 and 6, a leaning operation of the leaning vehicle 1 will be described. FIG. 6 is a front view, as seen from the front of the body frame 21, of the front portion of the leaning vehicle 1 with the body frame 21 caused to lean to the left of the leaning vehicle 1. FIG. 6 shows a state in which the front portion of the leaning vehicle 1 is seen through the front cover 221 that is indicated by dashed lines.

As shown in FIG. 2, with the leaning vehicle 1 standing in the upright state, when looking at the leaning vehicle 1 from the front of the body frame 21, the linkage 5 has a rectangular or substantially rectangular shape. As shown in FIG. 6, with the leaning vehicle 1 leaning to the left, when looking at the leaning vehicle 1 from the front of the body frame 21, the linkage 5 has a parallelogram shape.

The linkage 5 deforms as the body frame 21 leans in the left-and-right direction of the leaning vehicle 1. The operation of the linkage 5 means that the upper cross member 51, the lower cross member 52, the left side member 53, and the right side member 54 included in the linkage 5 turn relatively about turning axes which pass through the corresponding connecting portions A, C, E, G, H, I, such that the shape of the linkage 5 changes.

For example, as shown in FIG. 6, when the rider causes the leaning vehicle 1 to lean to the left, the link support 212 leans to the left relative to the vertical direction. When the link support 212 leans, the upper cross member 51 turns counterclockwise as seen from the front of the leaning vehicle 1 about the middle upper axis Mu that passes through the connecting portion C relative to the link support 212. Similarly, the lower cross member 52 turns counterclockwise as seen from the front of the leaning vehicle 1 about the middle lower axis Md that passes through the connecting portion I relative to the link support 212. This causes the upper cross member 51 to move to the left relative to the lower cross member 52.

As the upper cross member 51 moves to the left, the upper cross member 51 turns counterclockwise as seen from the front of the leaning vehicle 1 about the left upper axis that passes through the connecting portion A and the right upper axis that passes through the connecting portion E relative to the left side member 53 and the right side member 54, respectively. Similarly, the lower cross member 52 turns counterclockwise as seen from the front of the leaning vehicle 1 about the left lower axis that passes through the connecting portion G and the right lower axis that passes through the connecting portion H relative to the left side member 53 and the right side member 54, respectively. This causes the left side member 53 and the right side member 54 to lean to the left relative to the vertical direction with their postures kept parallel to the link support 212.

As this occurs, the lower cross member 52 moves to the left relative to the tie-rod 67. As the lower cross member 52 moves to the left, the shaft portions that are provided at the respective front portions of the middle joint 64, the left joint 65, and the right joint 66 turn relative to the-tie rod 67. This allows the tie-rod 67 to hold a parallel posture to the upper cross member 51 and the lower cross member 52.

As the left side member 53 leans to the left, the left bracket 317, which is connected to the left side member 53, leans to the left. As the left bracket 317 leans to the left, the left shock absorber 33, which is connected to the left bracket 317, leans to the left. As the left shock absorber 33 leans to the left, the left front wheel 31, which is supported on the left shock absorber 33, leans to the left with its posture kept parallel to the link support 212.

As the right side member 54 leans to the left, the right bracket 327, which is connected to the right side member 54, leans to the left. As the right bracket 327 leans to the left, the right shock absorber 34, which is connected to the right bracket 327, leans to the left. As the right shock absorber 34 leans to the left, the right front wheel 32, which is supported on the right shock absorber 34, leans to the left with its posture kept parallel to the link support 212.

The leaning operations of the left front wheel 31 and the right front wheel 32 are described based on the vertical direction. However, when the leaning vehicle 1 leans (when the linkage 5 is activated to operate), the up-and-down direction of the body frame 21 does not coincide with the vertical up-and-down direction. In a case where the leaning operations are described based on the up-and-down direction of the body frame 21, when the linkage 5 is activated to operate, the relative positions of the left front wheel 31 and the right front wheel 32 to the body frame 21 change. In other words, the linkage 5 changes the relative positions of the left front wheel 31 and the right front wheel 32 to the body frame 21 in the up-and-down direction of the body frame 21 to cause the body frame 21 to lean relative to the vertical direction.

When the rider causes the leaning vehicle 1 to lean to the right, the elements lean to the right. Since the elements move the other way around in relation to the left-and-right direction, detailed description thereof will be omitted here.

Figure 7:
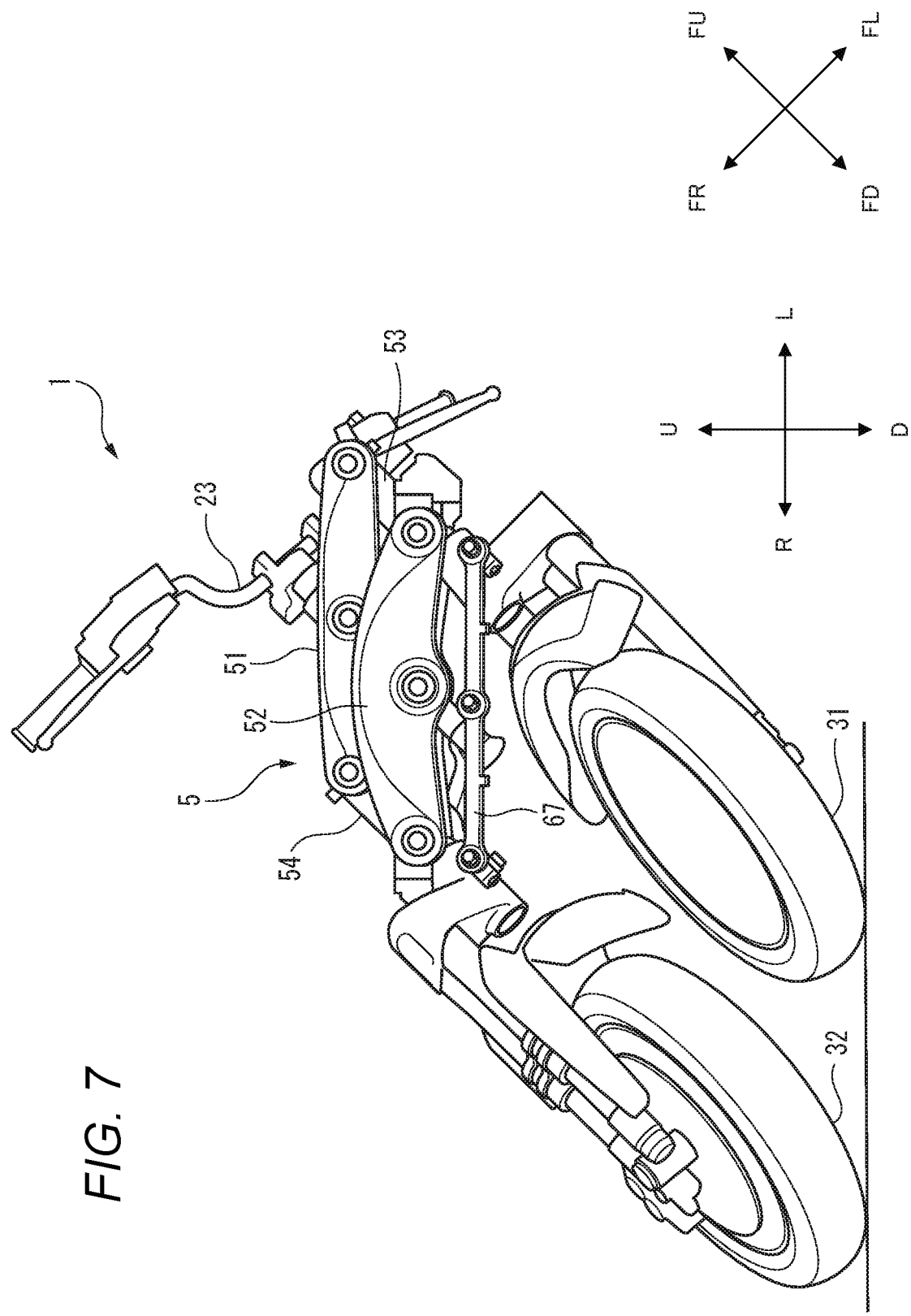
FIG. 7 is a front view showing the front portion of the leaning vehicle shown in FIG. 1 when the vehicle is steered while being caused to lean.

FIG. 7 is a front view of the front portion of the leaning vehicle 1 with the leaning vehicle 1 leaning and steered. FIG. 7 shows a state in which the leaning vehicle 1 is steered to the left while leaning to the left. The steering operation turns the left front wheel 31 and the right front wheel 32 to the left, and the leaning operation causes the left front wheel 31 and the right front wheel 32 to lean to the left together with the body frame 21. Namely, in this state, the linkage 5 exhibits the parallelogram shape, and the tie-rod 67 moves towards the left and rear of the body frame 21 from its position that the tie-rod 67 takes when the body frame 21 stays in the upright state.

Thus, as has been described above, the leaning vehicle 1 of this preferred embodiment includes the body frame 21 that leans to the right of the leaning vehicle 1 when the leaning vehicle 1 turns right and leans to the left of the leaning vehicle 1 when the leaning vehicle 1 turns left; the right front wheel 32 that is able to turn about the right steering axis that extends in the up-and-down direction of the body frame 21; the left front wheel 31 that is provided on the left of the right front wheel 32 in the left-and-right direction of the body frame 21 and that is able to turn about the left steering axis that is parallel to the right steering axis; the right shock absorber 34 that supports the right front wheel 32 at the lower portion thereof and that absorbs the displacement of the right front wheel 32 towards the upper portion thereof in the up-and-down direction of the body frame 21; the left shock absorber 33 that supports the left front wheel 31 at the lower portion thereof and that absorbs the displacement of the left front wheel 31 towards the upper portion thereof in the up-and-down direction of the body frame 21; and the linkage 5 that supports the right front wheel 32 and the left front wheel 31 so as to be displaced relative to each other in the up-and-down direction of the body frame 21.

The linkage 5 preferably includes the right side member 54 that supports the upper portion of the right shock absorber 34 so as to turn about the right steering axis; the left side member 53 that supports the upper portion of the left shock absorber 33 so as to turn about the left steering axis; the upper cross member 51 that supports the upper portion of the right side member 54 at the right end portion thereof so as to turn about the right upper axis that extends in the front-and-rear direction of the body frame 21, supports the upper portion of the left side member 53 at the left end portion thereof so as to turn about the left upper axis that is parallel to the right upper axis, and that is supported on the body frame 21 at the middle portion thereof so as to turn about the middle upper axis Mu that is parallel to the right upper axis and the left upper axis; and the lower cross member 52 that supports the lower portion of the right side member 54 at the right end portion thereof so as to turn about the right lower axis that is parallel to the right upper axis, supports the lower portion of the left side member 53 so as to turn about the left lower axis that is parallel to the left upper axis, and that is supported on the body frame 21 at the middle portion thereof so as to turn about the middle lower axis Md that is parallel to the middle upper axis Mu.

Next, the construction of the circumference of the front wheels 3 of the leaning vehicle 1 will be described in detail by reference to FIG. 2.

With the leaning vehicle 1 staying in the upright state, a lower end of the lower cross member 52 is positioned above an upper end of the right front wheel 32 and an upper end of the left front wheel 31.

The right front wheel 32 is able to turn about the right steering axis Y. The left front wheel 31 is able to turn about the left steering axis X. The right front wheel 32 and the left front wheel 31 are displaced in the up-and-down direction of the body frame 21 as the linkage 5 operates. The right front wheel 32 is able to turn about the right steering axis Y even when the right front wheel 32 is located in an uppermost position in the up-and-down direction of the body frame 21. The right front wheel 32 is able to turn about the right steering axis Y even when the right front wheel 32 is located in a lowermost position in the up-and-down direction of the body frame 21. The left front wheel 31 is able to turn about the left steering axis X even when the left front wheel 31 is located in an uppermost position in the up-and-down direction of the body frame 21. The left front wheel 31 is able to turn about the left steering axis X even when the left front wheel 31 is located in a lowermost position in the up-and-down direction of the body frame 21.

To enable the right front wheel 32 and the left front wheel 31 to be displaced in the ways described above, the right front wheel 32 and the left front wheel 31 are spaced apart from each other with a steering allowable space SS defined therebetween in relation to the left-and-right direction of the leaning vehicle 1. The steering allowable space SS is a space that is defined directly below the lower cross member 52 of the linkage 5 and between the right front wheel 32 and the left front wheel 31. As shown in FIGS. 1 and 2, this steering allowable space SS is designed so that as few parts as possible are provided therein. This enables the right front wheel 32 and the left front wheel 31 to be displaced freely without interfering with other members. In the event that a member is disposed within this steering allowable space SS, the steering allowable space SS is enlarged to avoid the interference of the right front wheel 32 and the left front wheel 31 with the member. Thus, the steering allowable space SS is a space that preferably includes no members.

The right shock absorber 34 is provided at a side of the right front wheel 32 opposite to a side that faces the steering allowable space SS in relation to the left-and-right direction of the body frame 21. The right shock absorber 34 is provided on the right of the right front wheel 32 in relation to the left-and-right direction of the body frame 21. The lower portion of the right shock absorber 34 supports a right portion of the right axle member 321. The right front wheel 32 is supported at a left portion of the right axle member 321.

The left shock absorber 33 is provided at a side of the left front wheel 31 opposite to a side that faces the steering allowable space SS in relation to the left-and-right direction of the body frame 21. The left shock absorber 33 is provided on the left of the left front wheel 31 in relation to the left-and-right direction of the body frame 21. The lower portion of the left shock absorber 33 supports a left portion of the left axle member 311. The left front wheel 31 is supported at a right portion of the left axle member 311.

The right fender 90R is provided at a lower portion of the right shock absorber 34. The right fender 90R is displaced together with the right front wheel 32 as the right shock absorber 34 operates. The right fender 90R is fixed to a member that is displaced together with the right front inner tube 344, the right inner connector 347, or the right rear inner tube 346 of the right shock absorber 34 when the right shock absorber 34 or the right shock absorber 34 operates. The right fender 90R may be fixed directly to the right shock absorber 34 or may be fixed thereto via a stay.

The left fender 90L is provided at a lower portion of the left shock absorber 33. The left fender 90L is displaced together with the left front wheel 31 as the left shock absorber 33 operates. The left fender 90L is fixed to a member that is displaced together with the left front inner tube 334, the left inner connector 337, or the left rear inner tube 336 of the left shock absorber 33 when the left shock absorber 33 or the left shock absorber 33 operates. The left fender 90 may be fixed directly to the left shock absorber 33 or may be fixed thereto via a stay.

Next, with reference to FIGS. 8 and 9, the left fender 90L will be described.

Figure 8:
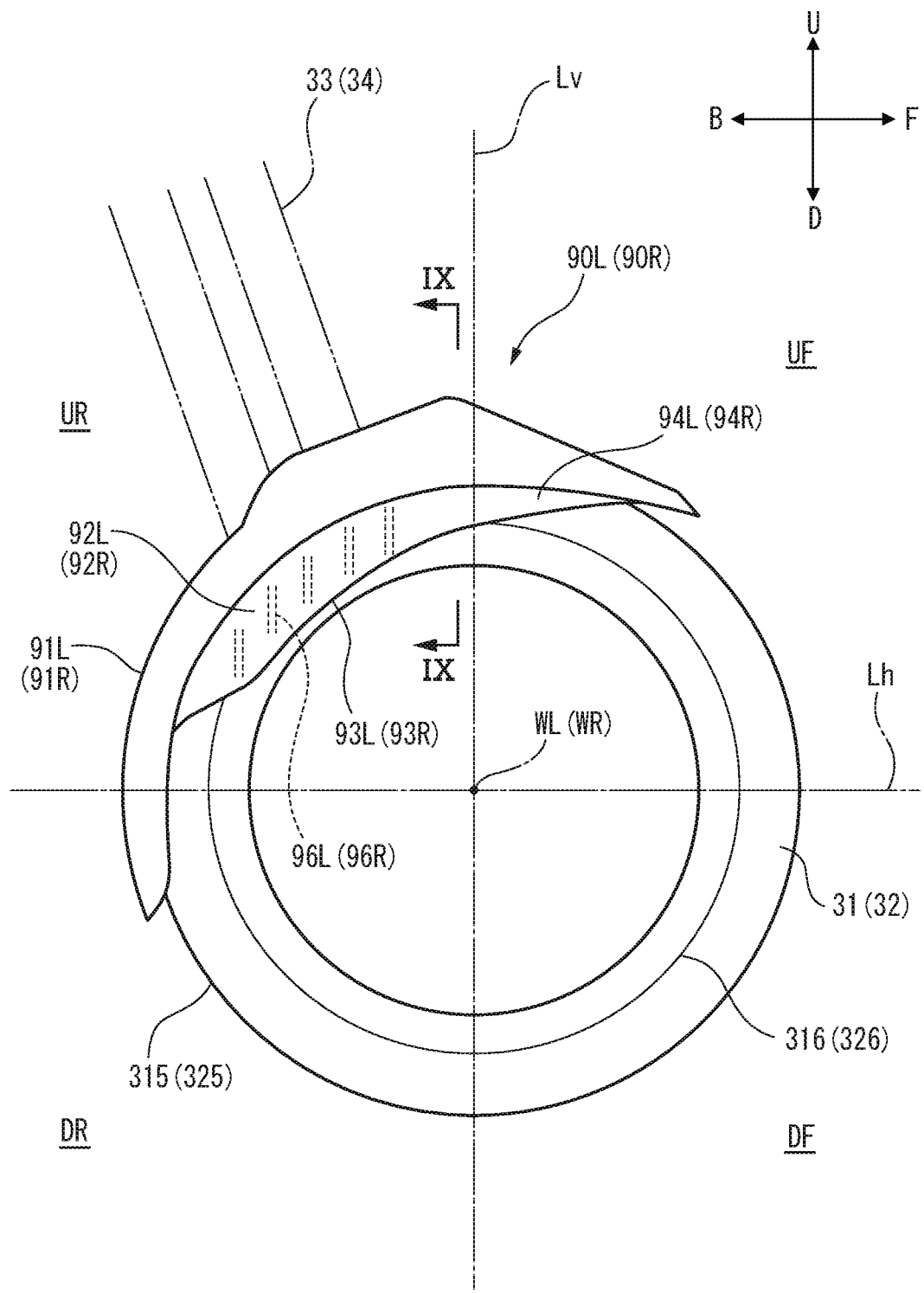
FIG. 8 is a side view of the left front wheel and a left fender when seen from the right in a left axle axis direction.

FIG. 8 shows the left front wheel 31 and the left fender 90L. FIG. 8 is a side view of the left front wheel 31 and the left fender 90L when seen from the right in a left axle axis WL direction. FIG. 9 is a sectional view taken along a line IX-IX and seen in a direction indicated by arrows shown in FIG. 8.

As shown in FIG. 8, when looking at the left fender 90L from the right in the left axle axis WL direction, an outer edge 91L of the left fender 90L is positioned farther radially outwards than an outer edge 315 of the left front wheel 31.

Figure 9:
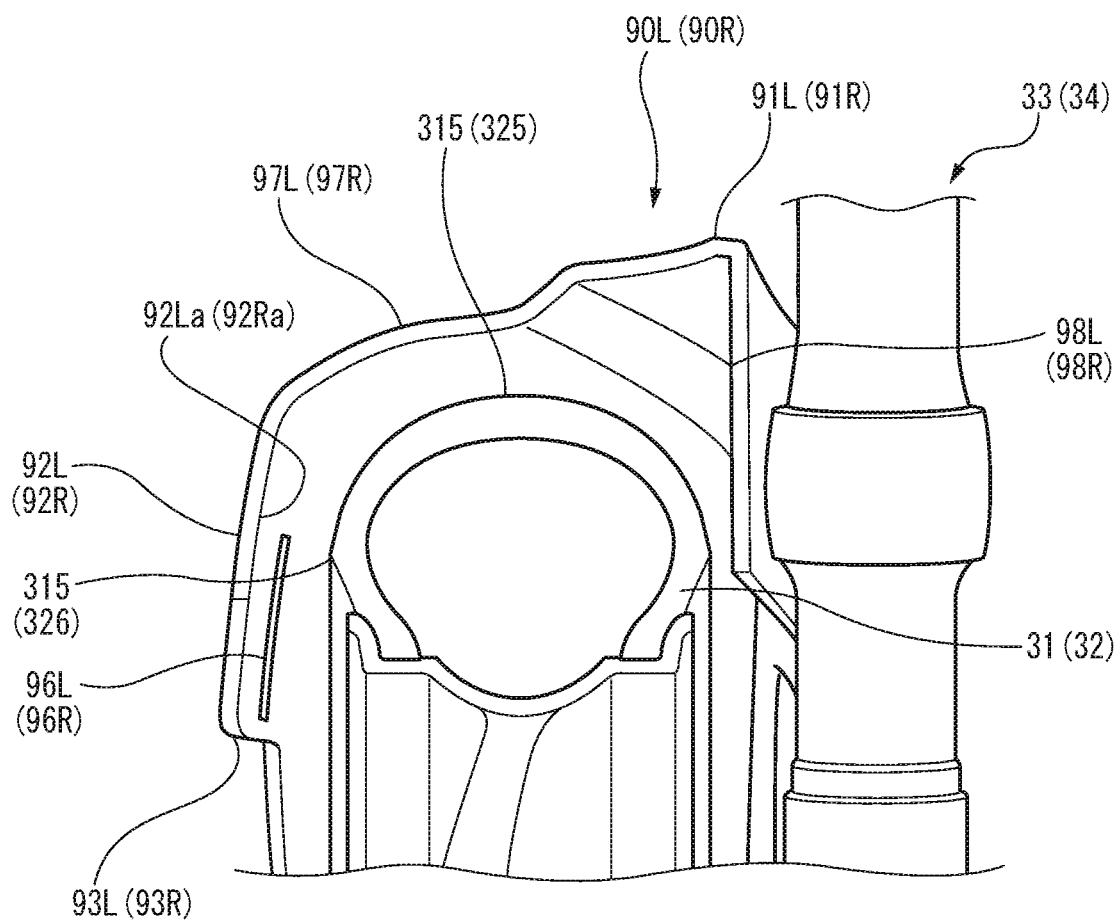
FIG. 9 is a sectional view taken along a line IX-IX and seen in a direction indicated by arrows shown in FIG. 8.

As shown in FIG. 9, the left fender 90L integrally includes a left-right wall 92L (an example of a left guide wall), a left-upper wall 97L, and a left-left wall 98L.

The left-upper wall 97L is positioned directly above the left front wheel 31. The left-upper wall 97L extends along the left-and-right direction and a tire surface of the left front wheel 31.

The left-right wall 92L is positioned on the right of the left front wheel 31. The left-right wall 92L extends in the up-and-down direction and the front-and-rear direction. An upper portion of the left-right wall 92L connects to a right portion of the left-upper wall 97L.

The left-left wall 98L is positioned on the left of the left front wheel 31. The left-left wall 98L extends in the up-and-down direction and the front-and-rear direction. An upper portion of the left-left wall 98L connects to a left portion of the left-upper wall 97L.

The left-upper wall 97L, the left-right wall 92L, and the left-left wall 98L are preferably integrally molded from a resin, for example. The left-upper wall 97L, the left-right wall 92L, and the left-left wall 98L may be connected together smoothly.

In this preferred embodiment, an outer surface of the left-upper wall 97L defines an outer edge 91L of the left fender 90L when seen from the right in the left axle axis WL direction.

As shown in FIG. 8, when seen from the right in the left axle axis WL direction, a straight line Lv that extends in the vertical direction and intersects the left axle axis WL and a straight line Lh that extends in the horizontal direction and intersects the left axle axis WL are shown. The left front wheel 31 is divided virtually into four uniform areas, which are an upper front area UF, an upper rear area UR, a lower front area DF, and a lower rear area DR, by the straight line Lv and the straight line Lh. The upper front area UF is an area located above the straight line Lh and ahead of the straight line Lv. The upper rear area UR is an area located above the straight line Lh and behind the straight line Lv. The lower front area DF is located below the straight line Lh and ahead of the straight line Lv. The lower rear area DR is located below the straight line Lh and behind the straight line Lv.

When the left front wheel 31 is divided as described above, the left-right wall 92L of the left fender 90L extends at least from the outer edge 91L inwards and towards the left axle axis WL in the upper rear area UR on the right of the left front wheel 31.

Since the right fender 90R is preferably laterally symmetrical with the left fender 90L, a detailed description thereof will be omitted. However, the right fender 90R preferably has the following structure.

When looking at the right fender 90R from the left in a right axle axis WL direction, an outer edge 91R of the right fender 90R is positioned farther radially outwards than an outer edge 325 of the right front wheel 32.

The right fender 90R includes a right-left wall 92R (an example of a right guide wall). When seen from the left in the right axle axis WR direction, a straight line Lv that extends in the vertical direction and intersects the right axle axis WR and a straight line Lh that extends in the horizontal direction and intersects the right axle axis WR are shown. The right front wheel 32 is divided virtually into four uniform areas, which are an upper front area UF, an upper rear area UR, a lower front area DF and a lower rear area DR, by the straight line Lv and the straight line Lh. In this division, the right-left wall 92R of the right fender 90R extends from an outer edge 91R inwards and towards the right axle axis WR in the upper rear area UR of the right front wheel 32 on the left of the right front wheel 32.

In the leaning vehicle 1 described above, the right front wheel 32 and the left front wheel 31 are spaced apart from each other in the left-and-right direction with the steering allowable space SS defined therebetween. In the leaning vehicle 1 including the steering allowable space SS described above, the inventor of preferred embodiments of the present invention has discovered that an amount of water that enters the steering allowable space SS is significantly reduced or prevented so as to significantly reduce or prevent water that scatters to the front of the vehicle from the steering allowable space SS.

A cover that covers the right front wheel 32 when seen in the right axle axis WR direction at the right side of the right front wheel 32 and a cover that covers the left front wheel 31 when seen in the left axle axis WL direction at the right of the left front wheel 31 is able to cut off water that attempts to enter the steering allowable space SS from the right front wheel 32 and the left front wheel 31. However, this approach restricts greatly the design of the leaning vehicle 1. Additionally, the covers move greatly as the right front wheel 32 and the left front wheel 31 are turned, and this requires an enlargement in the size of the steering allowable space SS, resulting in an enlargement in the size of the leaning vehicle 1 in the left-and-right direction.

The inventor of preferred embodiments of the present invention discovered how water splashed by the front wheels 3 scatters or flies therefrom. Water on the road surface adheres to a ground contact surface of a tire first. An inertial force is provided to the water that adheres to the ground contact surface of the tire as the tire rotates. It was discovered that, due to the effect of the inertial force, the water that adheres to the ground contact surface of the tire leaves from the ground contact surface at a point in time when the tire rotates a quarter of one rotation at an earliest timing, and that almost no water leaves from the ground contact surface at a point in time when the tire rotates a half of one rotation.

Water that leaves from a ground contact point flies substantially towards a tangential direction of the ground contact surface when seen from the axle axis direction. More specifically, water leaving the ground contact surface at a point in time when the tire rotates a quarter of one rotation flies upwards, and water leaving the ground contact surface at a point in time later than the point in time when the tire rotates a quarter of one rotation flies farther forwards than the water that flew at the point in time when the tire rotates a quarter of one rotation. When looking at the front wheels 3 from their traveling direction, water that leaves from the ground contact surface also flies to the right or left of the leaning vehicle 1 although a main stream thereof flies in a direction that is contained in an imaginary rotational plane of the front wheels 3. Then, water that scatters to the left from the right front wheel 32 and water that scatters to the right from the left front wheel 31 collide with each other in the steering allowable space SS, such that the scattering water is formed into minute particles of water, and it takes some time before the resulting minute particles of water fall down onto the ground.

Different from preferred embodiments of the present invention, it is known to provide a two-wheeled vehicle with a fender to suppress the scattering of water mainly in a direction that is contained in the imaginary rotational plane of a front wheel. However, when providing the fender of a known two-wheeled vehicle to the leaning vehicle 1 of preferred embodiments of the present invention, water that is received by the fender flows over an inner surface of the fender and falls downwards from an outer edge portion thereof. When the water falling downwards hits the rotating front wheels 3, the water is formed into minute particles of water and stays afloat in the steering allowable space SS.

Then, the inventor of preferred embodiments of the present invention discovered the idea of providing the right-left wall 92R and the left-right wall 92L in the upper rear areas UR that result when dividing imaginarily the front wheels 3 in the up-and-down and front-and-rear directions into the four uniform areas when seen in the axle axis directions.

According to a preferred embodiment of the present invention, water splashed up by the right front wheel 32 hits the right-left wall 92R to adhere to the right-left wall 92R. The water that adheres to the right-left wall 92R then flows directly downwards over the right-left wall 92R without entering the steering allowable space SS. Similarly, water splashed up by the left front wheel 31 flows over the left-right wall 92L to fall directly downwards without entering the steering allowable space SS.

Similarly, water splashed up by the left front wheel 31 hits the left-right wall 92L to adhere to the left-right wall 92L. The water adhering to the left-right wall 92L flows over the left-right wall 92L to fall downwards without entering the steering allowable space SS. Similarly, water splashed up by the left front wheel 31 flows over the left-right wall 92L to fall directly downwards without entering the steering allowable space SS.

Because of this, the amount of water that enters the steering allowable space SS is significantly reduced or prevented. This makes it difficult for water to be formed into minute particles of water in the steering allowable space SS, such that water in the steering allowable space SS is prevented from passing in front of the leaning vehicle 1 to adhere to the upper portion of the front portion of the leaning vehicle 1. This eliminates the necessity of providing a large cover at the front portion and the upper portion of the leaning vehicle 1, such that an enlargement in the size of the leaning vehicle 1 is prevented.

In a vehicle including a double wishbone (DWB) type linkage, a space between a right front wheel and a left front wheel tends to be wide when compared with a vehicle described above that includes the parallelogram type linkage. Due to this, even though water enters the steering allowable space SS, a risk of splashed water hitting each other near a center of the steering allowable space is small. Alternatively, even though splashed water hit each other in the relevant space, the water hits when the velocity thereof is reduced to a slower level, and therefore, water is not formed into minute particles of water. Thus, the water falls down onto the ground from the vicinity of the center of the steering allowable space SS. This makes it difficult for the problem described above to occur.

Further, in the vehicle including the double-wishbone (DWB) type linkage, the linkage is positioned on the left of the right front wheel and the right of the left front wheel in many cases. Namely, an opportunity of water splashed up by the right front wheel and the left front wheel being formed into minute particles of water is small. Because of this, it is difficult for the problem discussed above to be caused in the vehicle including the double wishbone (DWB) type linkage.

In a vehicle like the vehicle including the double wishbone (DWB) type linkage in which shock absorbers are provided between a right front wheel and a left front wheel, water splashed up by the right front wheel and the left front wheel adhere to the shock absorbers, and it becomes difficult for the water to be scattered to an upper portion of a front portion of the vehicle by scattering around the front of the vehicle.

In the leaning vehicle 1 of a preferred embodiment of the present invention, as shown in FIG. 9, at least a portion of a lower edge 93L of the left-right wall 92L of the left fender 90L is positioned on the right of a rightmost edge in the left axle axis WL direction of a portion of the left front wheel 31 in relation to the left axle axis WL direction.

At least a portion of a lower edge 93R of the left-right wall 92R of the right fender 90R is positioned on the left of a leftmost edge in the right axle axis WR direction of a portion of the right front wheel 32 in relation to the right axle axis WR direction.

According to a preferred embodiment of the present invention, even though water adhering to the left-right wall 92L falls downwards from the lower edge 93L of the left-right wall 92L, the water never splashes the front wheel 3 again. Similarly, even though water adhering to the right-left wall 92R falls downwards from the lower edge 93R of the right-left wall 92R, the water never splashes the front wheel 3 again. This makes the water fall down onto the ground.

According to a preferred embodiment of the present invention, as shown in FIG. 8, the left fender 90L includes, in the upper front area UF of the left front wheel 31, a left inclined wall 94L that connects to the left-right wall 92L and extends inward in the left axle axis WL direction farther than the left-right wall 92L.

The right fender 90R includes in the upper front area UF of the right front wheel 32 a right inclined wall 94R that connects to the right-left wall 92R and extends farther inwards in the right axle axis WR direction than the right-left wall 92R.

According to a preferred embodiment of the present invention, the left inclined wall 94L contributes to improving the rigidity of the left-right wall 92L, thus making it possible to prevent the deformation of the left-right wall 92L. Similarly, the right inclined wall 94R contributes to improving the rigidity of the right-left wall 92R, thus making it possible to prevent the deformation of the right-left wall 92R. This makes the water fall down onto the ground.

According to a preferred embodiment of the present invention, as shown in FIGS. 8 and 9, a left guide groove 96L is provided on a right surface 92La of the left-right wall 92L of the left fender 90L so as to guide water adhering thereto to flow downwards. A plurality of left guide grooves 96L preferably extend in the vertical direction.

A right guide groove 96R is provided on a left surface 92Ra of the right-left wall 92R of the right fender 90R so as to guide water adhering thereto to flow downwards. A plurality of right guide grooves 96R preferably extend in the vertical direction.

Water adhering to the right surface 92La of the left-right wall 92L has an inertial force that forces it to move upwards and forwards as a result of being splashed up by the left front wheel 31. In addition, water adhering to the right surface 92La of the left-right wall 92L is exposed to running air such that a force forcing it to move rearwards is also added thereto. Because of this, forces of various directions and magnitudes act on water adhering to the right surface 92La of the left-right wall 92L depending on the running conditions of the leaning vehicle 1.

According to a preferred embodiment of the present invention, however, water is guided downwards at all times by the left guide grooves 96L and the right guide grooves 96R irrespective of the running state of the vehicle. This causes the water to fall down onto the ground in every situation.

According to a preferred embodiment of the present invention, as shown in FIG. 8, the left-right wall 92L of the left fender 90L extends from the outer edge 315 of the left front wheel 31 farther inwards than the shoulder portion 316 of the left front wheel 31 when seen from the right in the left axle axis WL direction.

The right-left wall 92R of the right fender 90R extends from the outer edge 325 of the right front wheel 32 farther inwards than the shoulder portion 326 of the right front wheel 32 when seen from the left in the right axle axis WR direction.

According to a preferred embodiment of the present invention, since the left-right wall 92L is elongated, it is easy for water falling downwards to fall down onto the ground without causing it to adhere to the left front wheel 31. Similarly, since the right-left wall 92R is elongated, it is easy for water falling downwards to fall down onto the ground without causing it to adhere to the right front wheel 32.

According to a preferred embodiment of the present invention, as shown in FIG. 8, when seen from the right in the left axle axis direction, the left guide wall does not extend farther inwards than the shoulder portion of the left front wheel in any area of the upper front arear UF, the lower front area DF, and the lower rear area DR. Similarly, when seen from the right in the right axle axis direction, the right guide wall does not extend farther inwards than the shoulder portion of the right front wheel in any area of the upper front arear UF, the lower front area DF, and the lower rear area DR.

Because of this, providing the right-left wall 92R only on a portion of the right fender 90R is able to prevent water from entering the steering allowable space SS, thus making it possible to prevent an enlargement in the size of the right fender 90R. Similarly, it is possible to prevent an enlargement in the size of the left fender 90L. Thus, it is possible to prevent an enlargement in the size of the leaning vehicle 1.

According to a preferred embodiment of the present invention described above, the leaning vehicle 1 preferably includes one rear wheel 4. However, a plurality of rear wheels may be provided.

According to a preferred embodiment of the present invention described above, the center of the rear wheel 4 in relation to the left-and-right direction of the body frame 21 preferably coincides with the center of the distance between the left front wheel 31 and the right front wheel 32 in relation to the left-and-right direction of the body frame 21. Although the structure described above is preferable, the center of the rear wheel 4 in relation to the left-and-right direction of the body frame 21 may not coincide with the center of the distance between the left front wheel 31 and the right front wheel 32 in relation to the left-and-right direction of the body frame 21.

In a preferred embodiment of the present invention described above, the linkage 5 preferably includes the upper cross member 51 and the lower cross member 52. However, the linkage 5 may include a cross member other than the upper cross member 51 and the lower cross member 52. The "upper cross member" and the "lower cross member" are merely so called based on their relative positional relationship in the up-and-down direction. The upper cross member is not intended to imply an uppermost cross member in the linkage 5. The upper cross member refers to a cross member that is located above a cross member that is located therebelow. The lower cross member is not intended to imply a lowermost cross member in the linkage 5. The lower cross member refers to a cross member that is located below another cross member that is located thereabove. At least one of the upper cross member 51 and the lower cross member 52 may include two members of a right cross member and a left cross member. Because of this, the upper cross member 51 and the lower cross member 52 may include a plurality of cross members as long as they maintain the link function.

When the word "parallel" is used in this description, it means that "parallel" also includes two straight lines which do not intersect each other as members while they are inclined within an angular range of about ±40 degrees, for example. When "along" is used in relation to a direction or a member in this specification, it means that a case is also included where the direction or the member is inclined within an angular range of about ±40 degrees, for example. When the expression reading "something extends in a certain direction" is used in this specification, it means that a case is also included where something extends in the certain direction while being inclined within an angular range of about ±40 degrees, for example, with respect to the certain direction.

The terms and expressions that are used herein are used to describe preferred embodiments of the present invention and hence should not be construed as limiting the scope of the present invention. It should be understood that any equivalents to the characteristic matters which are shown and described herein should not be excluded and that various modifications within the scope of claims to be made later are permitted. The present invention can be embodied in many different forms.

This disclosure should be understood to provide preferred embodiments of the present invention. The preferred embodiments of the present invention are described herein based on the understanding that the present invention is not intended to be limited to the preferred embodiments so described and/or illustrated herein. The present invention is not limited to the preferred embodiments that have been described above. The present invention also includes every preferred embodiment that includes equivalent elements, modifications, deletions, combinations, improvements and/or alternations that those skilled in the art to which the present invention pertains can recognize based on the disclosure herein. The limitative matters of the claims should be construed broadly based on terms used in the claims and hence should not be limited by the preferred embodiments described in this specification or the prosecution of this patent application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A leaning vehicle comprising:
   a body frame that leans right when the vehicle turns to the right and leans left when the vehicle turns to the left;
   a right front wheel that is displaced relative to the body frame as the body frame leans, and that turns about a right axle member that extends in a right axle axis direction;
   a left front wheel that is displaced relative to the body frame as the body frame leans, and that turns about a left axle member that extends in a left axle axis direction;
   a linkage that changes relative positions of the right front wheel and the left front wheel in an up-and-down direction of the body frame as the body frame leans;
   a right shock absorber supporting a right portion of the right axle member at a lower portion thereof and that absorbs a displacement of the lower portion relative to an upper portion thereof in a direction of a right extension and contraction axis that extends in the up-and-down direction of the body frame; and
   a left shock absorber supporting a left portion of the left axle member at a lower portion thereof and that absorbs a displacement of the lower portion relative to an upper portion thereof in a direction of a left extension and contraction axis that extends in the up-and-down direction of the body frame; wherein
   the linkage includes:
      a right side member that supports the upper portion of the right shock absorber so as to turn about a right steering axis that extends in the up-and-down direction of the body frame;
      a left side member that supports the upper portion of the left shock absorber so as to turn about a left steering axis that is parallel to the right steering axis;
      an upper cross member that supports an upper portion of the right side member at a right end portion thereof so as to turn about a right upper axis that extends in a front-and-rear direction of the body frame, supports an upper portion of the left side member at a left end portion thereof so as to turn about a left upper axis that is parallel to the right upper axis, and is supported on the body frame at a middle portion thereof so as to turn about a middle upper axis that is parallel to the right upper axis and the left upper axis; and
      a lower cross member that supports a lower portion of the right side member at a right end portion thereof so as to turn about a right lower axis that is parallel to the right upper axis, supports a lower portion of the left side member at a left end portion thereof so as to turn about a left lower axis that is parallel to the left upper axis, and is supported on the body frame at a middle portion thereof so as to turn about a middle lower axis that is parallel to the middle upper axis;

with the vehicle in an upright state, a lower end of the lower cross member is positioned above an upper end of the right front wheel and an upper end of the left front wheel in relation to the up-and-down direction of the body frame;

the right front wheel and the left front wheel are spaced apart from each other in a left-and-right direction of the vehicle with a steering allowable space defined therebetween such that the right front wheel is able to turn about the right steering axis and the left front wheel is able to turn about the left steering axis;

the right shock absorber is provided at a side of the right front wheel opposite to a side that faces the steering allowable space in relation to a left-and-right direction of the body frame;

the left shock absorber is provided at a side of the left front wheel opposite to a side that faces the steering allowable space in relation to the left-and-right direction of the body frame;

a right fender is provided at a lower portion of the right shock absorber so as to be displaced together with the right front wheel as the right shock absorber is displaced;

an outer edge of the right fender is positioned radially outwards of an outer edge of the right front wheel when the right fender and the right front wheel are seen from the left in the right axle axis direction;

when the right front wheel is divided into four uniform areas by a straight line that extends in a vertical direction and intersects the right axle axis and a straight line that extends in a horizontal direction and intersects the right axle axis, the right fender as seen from the left in the right axle axis direction includes, in an upper rear area of the right front wheel, a right guide wall that extends inwards and towards the right axle axis from the outer edge of the right fender on a left side of the right front wheel;

a left fender is provided at a lower portion of the left shock absorber so as to be displaced together with the left front wheel as the left shock absorber is displaced;

an outer edge of the left fender is positioned radially outwards of an outer edge of the left front wheel when the left fender and the left front wheel are seen from the right in the left axle axis direction; and when the left front wheel is divided into four uniform areas by a straight line that extends in a vertical direction and intersects the left axle axis and a straight line that extends in a horizontal direction and intersects the left axle axis, the left fender as seen from the right in the left axle axis direction includes, in an upper rear area of the left front wheel, a left guide wall that extends inwards and towards the left axle axis from the outer edge of the left fender on a right side of the left front wheel.

2. The leaning vehicle according to claim 1, wherein
at least a portion of a lower edge of the right guide wall is located directly to the left of a leftmost edge of the right front wheel in the right axle axis direction; and
at least a portion of a lower edge of the left guide wall is located directly to the right of a rightmost edge of the left front wheel in the left axle axis direction.

3. The leaning vehicle according to claim 1, wherein
the right fender includes, in an upper front area of the right front wheel, a right inclined wall that connects to the right guide wall and extends farther inwards than the right guide wall; and
the left fender includes, in an upper front area of the left front wheel, a left inclined wall that connects to the left guide wall and extends farther inwards than the left guide wall.

4. The leaning vehicle according to claim 1, further comprising:
a right guide groove on a left surface of the right guide wall that guides water adhering thereto downwards; and
a left guide groove on a right surface of the left guide wall that guides water adhering thereto downwards.

5. The leaning vehicle according to claim 1, wherein
the right guide wall extends from the outer edge of the right front wheel farther inwards than a shoulder portion of the right front wheel when seen from the left in the right axle axis direction; and
the left guide wall extends from the outer edge of the left front wheel farther inwards than a shoulder portion of the left front wheel when seen from the right in the left axle axis direction.

* * * * *